United States Patent

Riess et al.

[11] Patent Number: 5,960,922
[45] Date of Patent: Oct. 5, 1999

[54] HYDRAULIC CYLINDER SUCH AS A CLUTCH MASTER OR SERVANT CYLINDER IN A MOTOR VEHICLE HAVING A BLEED ELEMENT

[75] Inventors: Thomas Riess, Mürsbach; Olaf Pagels, Bergrheinfeld; Boleslaw Tulaczko, Niederwerrn; Wolfgang Grosspietsch, Schweinfurt, all of Germany

[73] Assignee: Fichtel & Sachs AG, Schweinfurt, Germany

[21] Appl. No.: 08/859,151

[22] Filed: May 20, 1997

[30] Foreign Application Priority Data

May 20, 1996 [DE] Germany ............................. 196 20 188
Nov. 25, 1996 [DE] Germany ............................. 196 48 683

[51] Int. Cl.[6] .................................................. F15B 21/04
[52] U.S. Cl. ......................... 192/85 C; 60/584; 188/352
[58] Field of Search ................................ 192/85 C, 70.11; 60/584; 188/352; 251/216; 277/354

[56] References Cited

U.S. PATENT DOCUMENTS

| D. 369,773 | 5/1996 | Wang . | |
|---|---|---|---|
| 2,531,705 | 11/1950 | Schultz ................................. | 60/584 X |
| 3,098,508 | 7/1963 | Gerdes ................................. | 251/216 X |
| 3,279,743 | 10/1966 | de la Garza . | |
| 3,406,519 | 10/1968 | Hackett ................................. | 60/584 X |
| 3,425,750 | 2/1969 | Deane ................................. | 188/352 X |
| 3,491,783 | 1/1970 | Linsalato ............................. | 251/216 X |
| 4,181,370 | 1/1980 | Noeami et al. ...................... | 188/352 X |
| 4,318,460 | 3/1982 | Kosinski .............................. | 60/584 X |
| 4,470,577 | 9/1984 | Warwick ............................. | 188/352 X |
| 4,840,081 | 6/1989 | Nagano . | |
| 4,909,094 | 3/1990 | Yoshigai . | |
| 5,009,299 | 4/1991 | Seegers .................................. | 192/85 C |
| 5,273,141 | 12/1993 | Veret et al. .......................... | 60/584 X |
| 5,448,927 | 9/1995 | Lumpkin . | |
| 5,560,457 | 10/1996 | Rike ...................................... | 188/352 |
| 5,575,178 | 11/1996 | Wu . | |

FOREIGN PATENT DOCUMENTS

| 2538765 | 7/1984 | France . |
|---|---|---|
| 5575 | 11/1878 | Germany . |
| 19516389 | 11/1996 | Germany . |

*Primary Examiner*—Rodney H. Bonck
*Attorney, Agent, or Firm*—Nils H. Ljungman & Associates

[57] ABSTRACT

A cylinder for pressure media, in particular a hydraulic master or slave cylinder in motor vehicles, having a bleed element which can be screwed into an aperture in the cylinder casing and which bleed element is sealed against the casing. The bleed element is functionally connected in the vicinity of that end inserted in the casing to a round sealing element, which is pressed axially against a shoulder in the aperture.

17 Claims, 20 Drawing Sheets

HYDRAULIC CYLINDER SUCH AS A CLUTCH MASTER OR SERVANT CYLINDER IN A MOTOR VEHICLE HAVING A BLEED ELEMENT

BACKGROUND OF THE INVENTION

1. Field of the Invention

The present invention relates to a cylinder for pressure media, in particular a hydraulic master or slave cylinder in motor vehicles, having a bleed element screwed into an aperture in the cylinder casing, which bleed element is sealed against the casing.

2. Background Information

With known master or slave cylinders in motor vehicles, the plenum is sealed by means of a screw-type bleed element which is screwed into a threaded aperture in the cylinder casing. Such bleed elements typically have conical sealing faces, which sealing faces are brought into contact with corresponding seal seats by the application of an axial force.

If these seal seats are made of plastic, they no longer offer sufficient resistance against the bleed elements at elevated temperatures. Consequently, the plastic begins to creep at the location in question and the connection is no longer tight. To alleviate this problem, a metal insert which serves as a seal seat for the bleed element is often placed in the plastic cylinder casing. However, there is then a risk of loss of seal between the plastic casing and the metal insert due to aging and the different deformation behaviors exhibited by the two materials under the influence of temperature.

The advantage of the conical seal seat is that only a few rotations are required to open the bleed element, making bleeding very easy.

To avoid the problems associated with the conical seal seats, Laid-Open German Patent Application DE-OS 195 16 389.3 teaches the use of a radial sealing ring. However, a greater number of rotations is required to open the bleed element with this solution than is the case with the conical seal seat.

OBJECT OF THE INVENTION

To solve this problem, a cylinder for pressure media having a bleed element which bleed element is designed such that a lasting and trouble-free seal is obtained while retaining easy bleeding offered by a conical seal.

SUMMARY OF THE INVENTION

The current invention teaches the use of a generic cylinder for pressure media characterized by the fact that the bleed element can be functionally connected at the casing end to a round sealing element which can be pressed axially against a shoulder located in the aperture.

With this configuration, there is no seal creep, even at elevated temperatures. Just a few rotations can be sufficient to free the axial seal from its seat and open the bleed element.

In one embodiment there can be a sealing element with a sealing surface having a planar face in the axial direction located at the end of the bleed element.

The sealing element can preferably be formed by an elastic cap fastened to a journal or pin or stud of the bleed element, which cap can be braced against a bead on the floor of the aperture.

In one embodiment, the sealing element can be inserted into the aperture and braced against a bead on the shoulder of the aperture by means of a journal mounted on one end of the bleed element.

The advantage of the elastic cap mounted to the bleed element compared to an insertable sealing element is that it cannot be lost if the bleed element is separated from the cylinder. Furthermore, preassembled units can be made available.

The bead is preferably ring-shaped and can be directly adjacent to the opening of the connecting aperture to the plenum of the cylinder. This configuration can ensure that the sealing element rests firmly against the floor of the aperture over the entire circumference of the connecting aperture.

It is particularly advantageous if the sealing element is ring-shaped. The sealing element can be realized as an O-ring seated in a groove in the bleed element, for example. The advantage of the ring shape is that the pressure inside the cylinder does not weaken the seal but exerts a radial force against the inside of the sealing element, thus enhancing the seal by increasing the force with which the sealing element is pressed against the sealing surface. An increase in internal pressure also further expands the ring-shaped sealing element, causing it to expand radially toward the aperture in the casing.

It is advantageous if the end of the bleed element which is inserted into the casing transitions into a centering journal which engages in a narrowing section of the aperture. This can ensure that the bleed element is properly positioned when screwed into the casing. The journal also protects against the loss of the sealing element and offers the advantage that preassembled units can be made available.

If the aperture is equipped at the same height as the sealing element with a bleed duct which receives fluid at the shoulder, the cylinder can be bled even when pressurized internally. For example, the cylinder can be vented by two people, one of whom presses the clutch pedal while the other removes the bleed screw. Because the internal pressure can deform the sealing element, the pressure is relieved via the bleed duct.

The same effect can be achieved if the aperture at the height of the sealing element has at least one axial groove extending above the height of the sealing element. However, a plurality of grooves distributed over the circumference of the aperture is preferable.

To limit the depth to which the bleed element can be screwed in and thus to protect the axial seal against overloading, it is advantageous for the bleed element to be equipped with a radially protruding shoulder, which makes contact with the outside of the cylinder casing. A variant can be realized by means of a shoulder located behind the internal thread in the aperture (at the run-out of the thread) and extending radially inward, with which shoulder a surface or widened area of the bleed element makes contact.

A radial seal to prevent fluid from leaking between the sealing element and the thread of the bleed element is particularly advantageous.

Another advantageous seal to prevent fluid from leaking can be realized if there are two diametrical ribs which protrude radially outward and run the length of the external thread of the bleed element.

To create these ribs on the plastic bleed element, in one embodiment the mold seam can be widened slightly so that material can accumulate there during injection molding. When screwing the bleed element into the threaded aperture, the ribs are squeezed such that the thread is sealed. In this embodiment, it can initially be somewhat more difficult to screw in the bleed element.

It can be particularly advantageous if the ribs protrude axially over a full turn.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Several embodiments of the current invention are described in greater detail below with reference to the attached drawings.

DESCRIPTION OF THE PREFERRED EMBODIMENT

Figure 1:
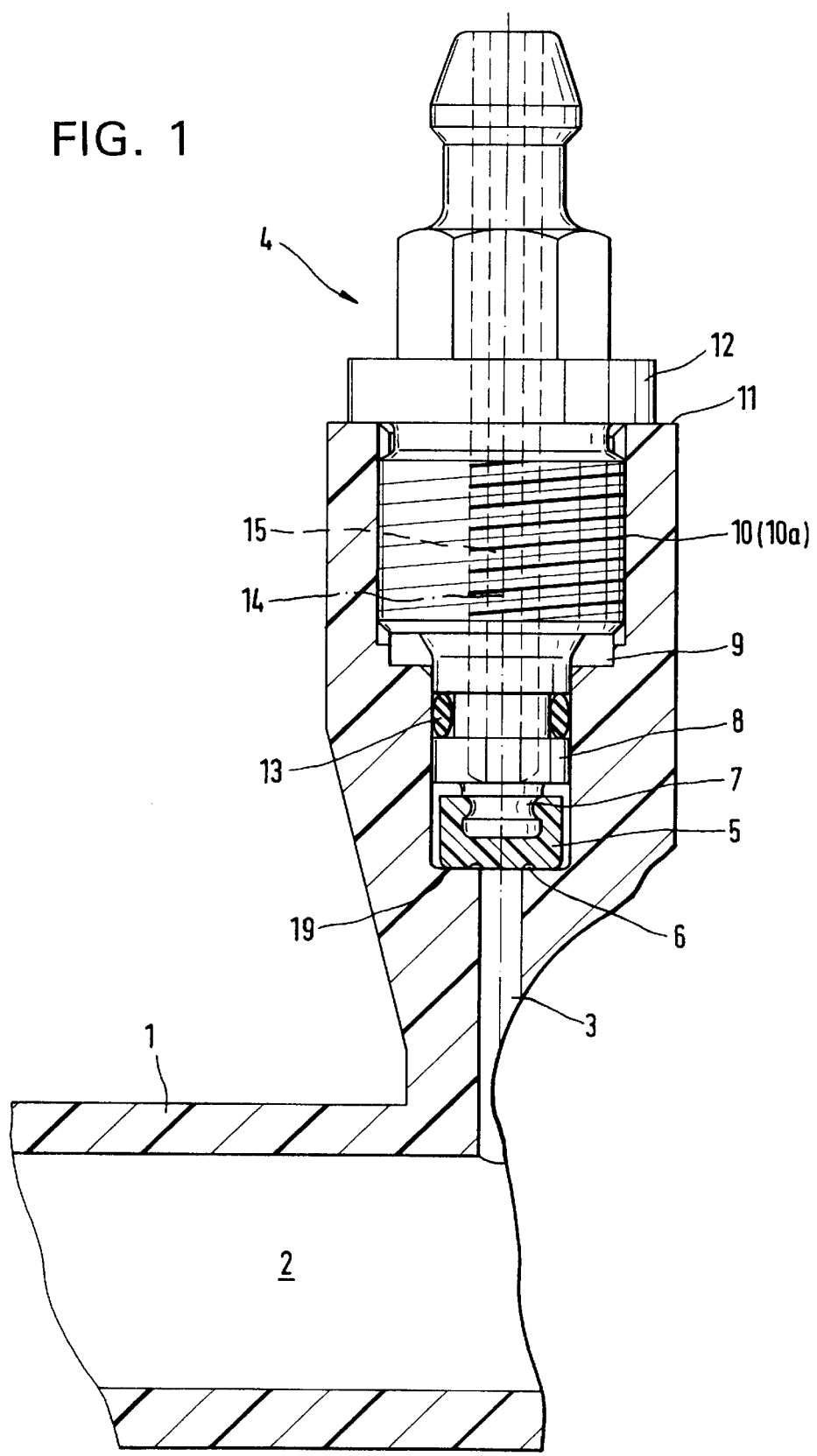
FIG. 1 shows a bleed element screwed into a cylinder for pressure media.
Figure 1A:
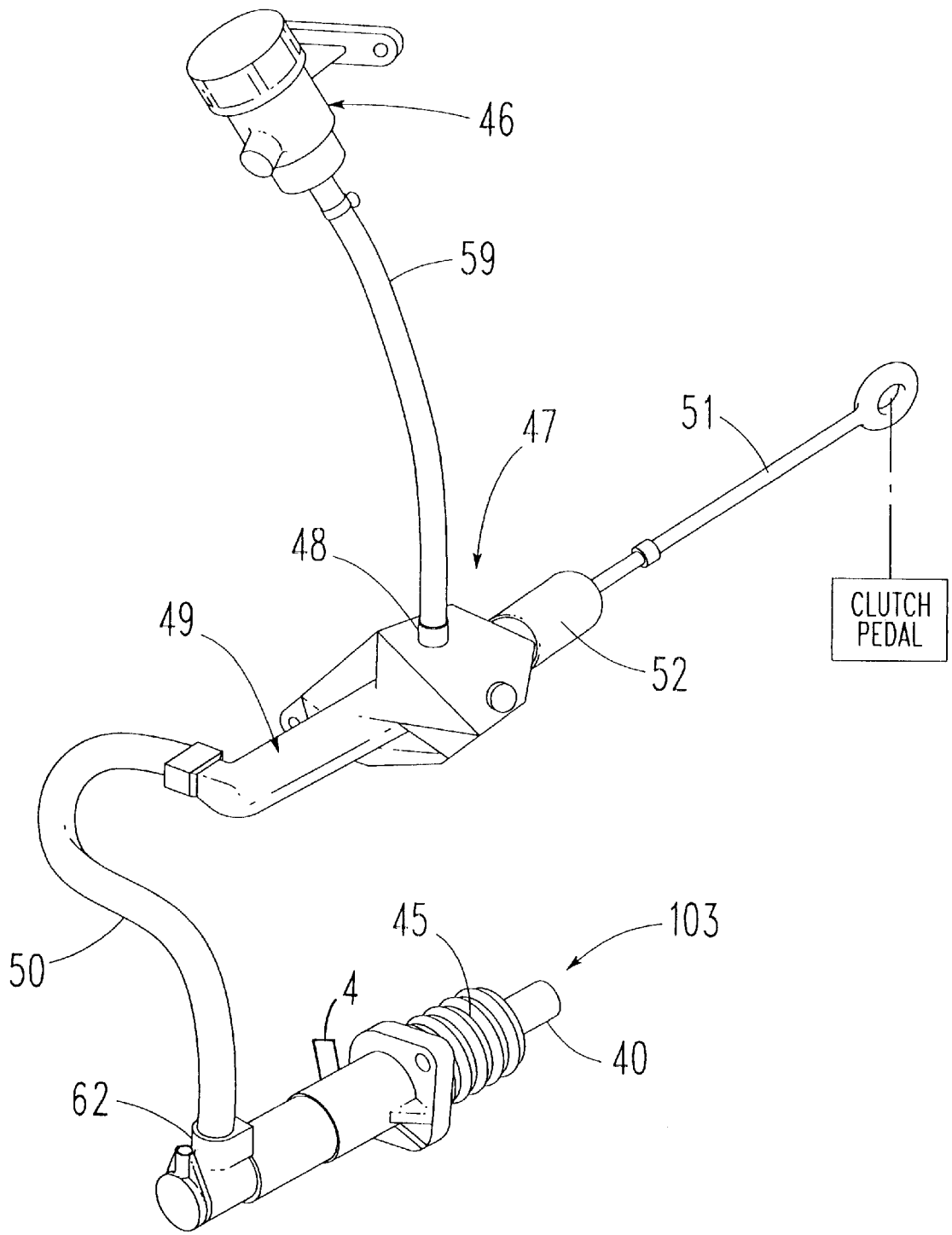
FIGS. 1A and 1B each show examples of hydraulically operated clutch assemblies.

FIG. 1A essentially shows a view of one possible use of a cylinder 103 described herein. The cylinder 103, in accordance with the present invention, could be used as a master or a servant cylinder in a hydraulic clutch system. As shown in FIG. 1A, the cylinder 103 is used as a servant cylinder. Such a system can preferably have a remote fluid reservoir 46 and a clutch master cylinder 47, the two being connected to one another by means of a line 59. The clutch master cylinder 47 can preferably be mounted opposite the dash of a motor vehicle, i.e. near the floor where the operator's feet would be, and can preferably be operated essentially directly off of the clutch pedal of the vehicle, preferably be means of a push rod 51, the clutch pedal being shown schematically in FIG. 1A. In addition, the master cylinder 47 can also have a protective boot 52. The cylinder or servant cylinder 103 can preferably be mounted by means of a fastening connection (not shown in FIG. 1A) on a clutch housing 55 (see FIG. 1B). A connecting element 40 can preferably be attached to a clutch release fork or throwout lever 51 (see FIG. 1B).

The clutch master cylinder 47, in accordance with the embodiment shown in FIG. 1A, preferably operates as the pump for pumping hydraulic fluid from reservoir 46, via a connection 48 and cylinder 49, to the servant cylinder 103. When the clutch pedal is depressed, hydraulic fluid under pressure can be pumped into the servant cylinder 103, via a line 50, and can cause a piston rod (not shown) to extend. The outer end of the piston rod can cause the clutch release fork 51 to pivot and force a clutch release bearing 58 (see FIG. 1B) to disengage the clutch. Since hydraulic systems are generally self-adjusting, when the clutch pedal is released, hydraulic pressure can fall off, and the piston rod of the servant cylinder 103 can withdraw.

In accordance with an alternative embodiment not shown here, the cylinder 103 could also be used as the master cylinder in the hydraulic clutch system shown in FIG. 1A. For example, the piston rod can preferably be operatively attached to the clutch pedal by means of push rod 51, hydraulic fluid can be received from reservoir 46, and a connection 62 can be used to provide hydraulic fluid, via line 50, to the servant cylinder.

Figure 1B:
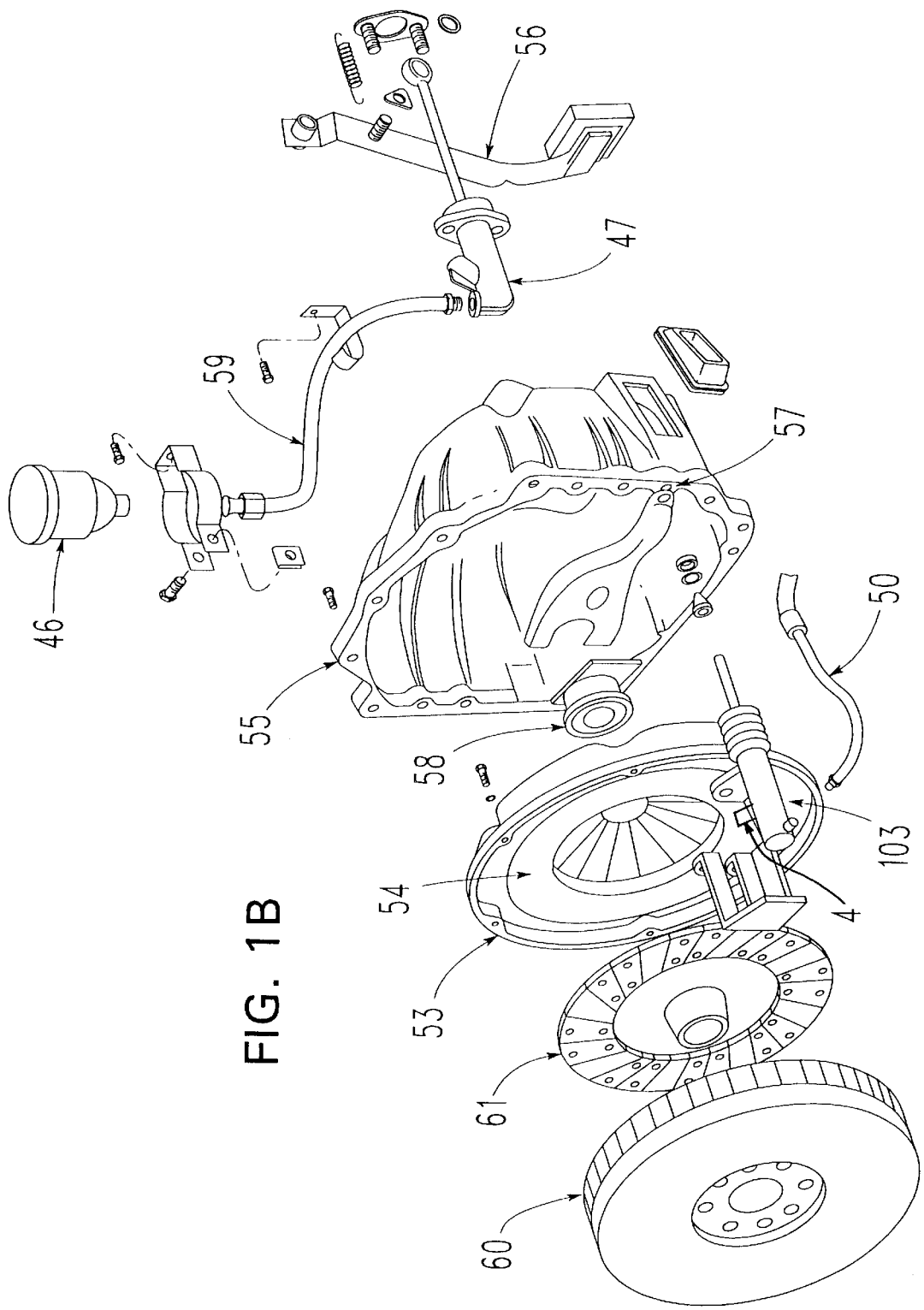

FIG. 1B shows a more complete hydraulic clutch system including a flywheel 60, a clutch disc 61, a clutch cover 53 having a movable pressure plate 54 disposed therein, and a clutch housing 55. In addition, the clutch system can also include a throwout or release bearing 58 and a clutch release fork or throwout lever 57, which release fork 57 can preferably be operatively attached to the servant cylinder 103. The servant cylinder 103 can preferably be connected, via line 50, to the master cylinder 47, the actual connection of which is not shown here for purposes of simplicity. As discussed above, the master cylinder 47 can preferably be connected to the clutch pedal 56, and to the reservoir 46 by means of line 59.

FIG. 1 shows a partial longitudinal section of a cylinder for pressure media into which a bleed element 4 has been screwed. The cylinder includes a plenum 2 in which a piston (not shown) has been installed such that it can be moved axially and by means of which piston the pressure can be relieved. The plenum 2 is connected to the seat of the bleed element 4 via the access aperture 3.

The bleed element 4 is screwed into a stepped aperture 9 in the casing 1 via a thread 10, 10a. The shank 8 of the bleed element 4 is equipped on that side facing the plenum 2 with a journal 7, onto which a cap 5 of some elastic material is snapped. For this purpose, the journal 7 is equipped with a circumferential groove 100 (see FIG. 1C) in which the bottom of the cap 5 engages. Located at the base of the aperture 9 is a circumferential bead 6 which limits the edge of the opening to the access aperture 3 and against which bead 6 the cap 5 is braced in the axial direction. To limit the depth to which the bleed element 4 is screwed in, the bleed element 4 has a shoulder 12 which protrudes outward and makes contact with the outside of the casing 1 at the point marked 11. To prevent leakage losses between the external thread 10 and the sealing cap 5, there is a radial seal 13 installed in a circumferential groove 101 (see FIG. 1C) in the shank 8. This radial seal 13 is preferably an O-ring.

A bleed duct 15 of the bleed element 4 is aligned with a center line 14. This bleed duct 15 remains closed as long as the sealing cap 5 is tight. If the bleed element 4 is screwed out of the aperture 9, the sealing cap 5 loses its seal and a connection between the access aperture 3 and the bleed duct 15 is established. In this case, the radial seal 13 prevents the pressure medium from escaping through the thread 10, 10a. The bleed duct 15 can (although not shown here) have a polygonal, e.g. rectangular or hexagonal, cross-section which can easily be engaged by a corresponding wrench for removal of the bleed element 4 from the casing 1.

Figure 1C:
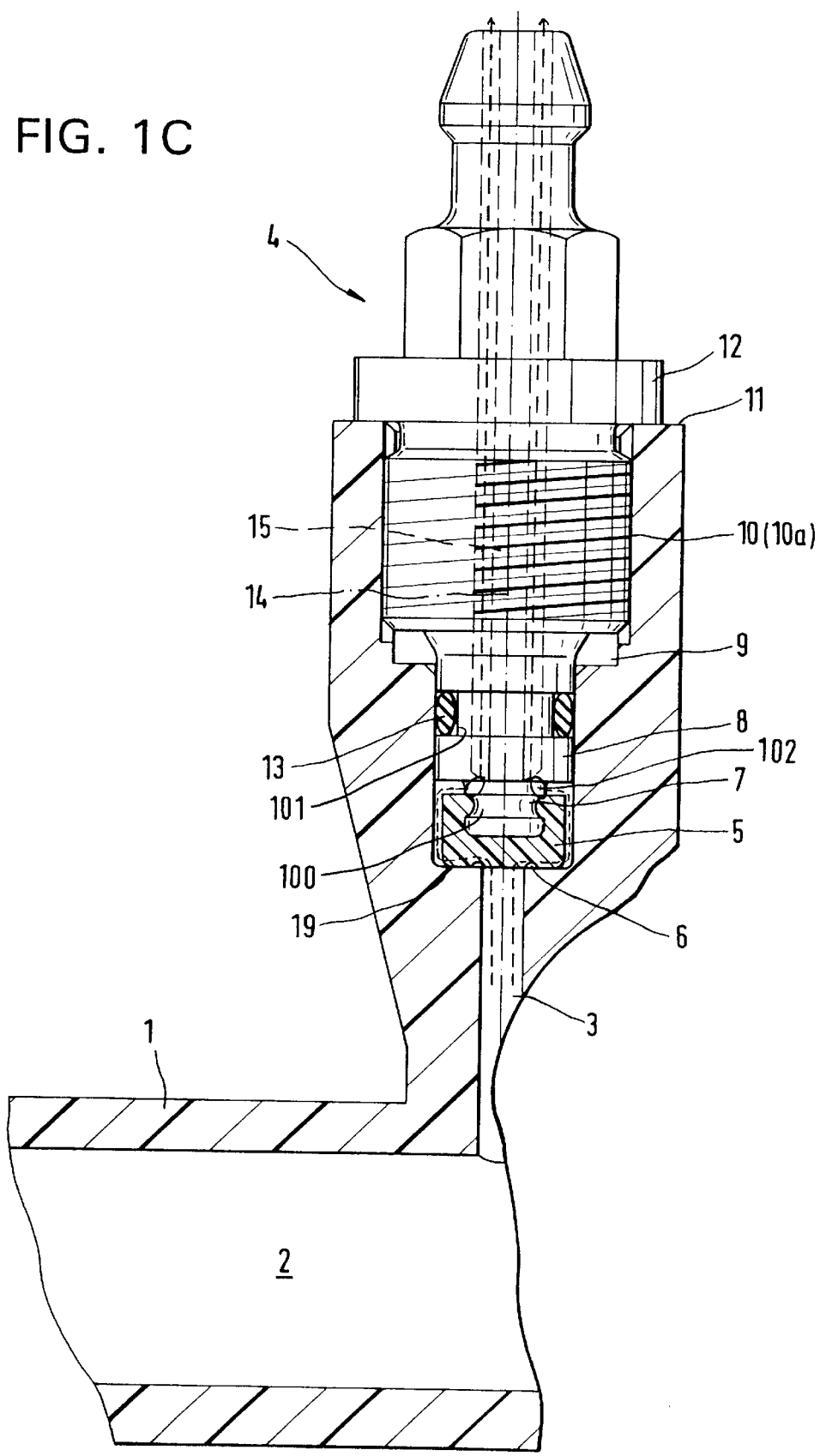
FIG. 1C shows FIG. 1 in more detail.

FIG. 1C shows the flow pathway that can be established when the sealing cap 5 loses its seal with the access aperture 3 and the connection between the bleed duct 15 and the access aperture 3 is established. The pressure medium may travel from the access aperture 3 through the pathway between the sealing cap 5 and the stepped aperture 9. The pressure medium may then flow from this pathway into an opening passage 102 in the bleed duct 15.

In one embodiment, shoulder 19 is positioned to that it can support the cap 5.

Figure 2:
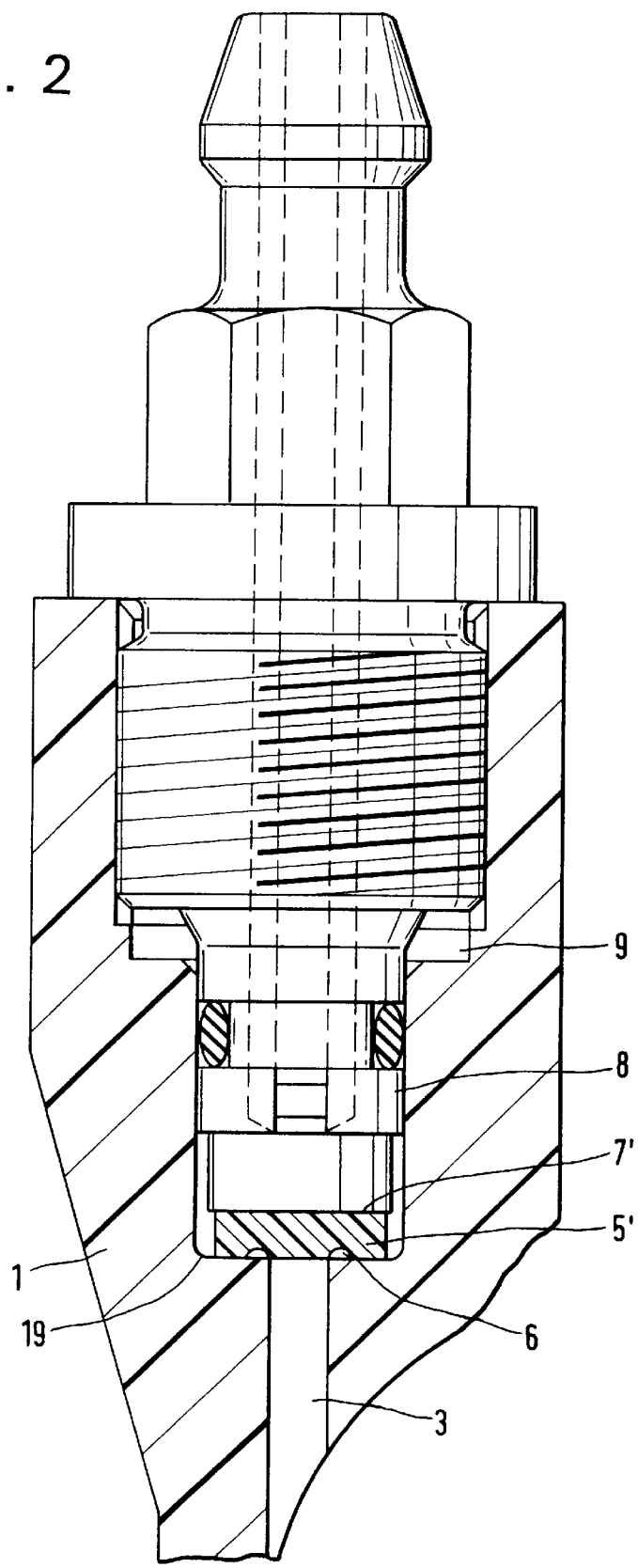
FIG. 2 shows another embodiment of a bleed element screwed into a cylinder for pressure media.

In the embodiment shown in FIG. 2, the sealing element is a sealing disk 5' which is inserted loosely into the aperture 9. Here, too, a bead 6 against which the sealing disk 5' is braced encircles the opening of the access aperture 3 in the casing 1. The outside diameter of the sealing disk 5' is smaller than the inside diameter of the aperture 9. To secure the sealing disk 5' in the axial direction, the end shank 8 is equipped with a planar journal 7', which has a greater outside diameter than the sealing disk 5'.

Figure 2A:
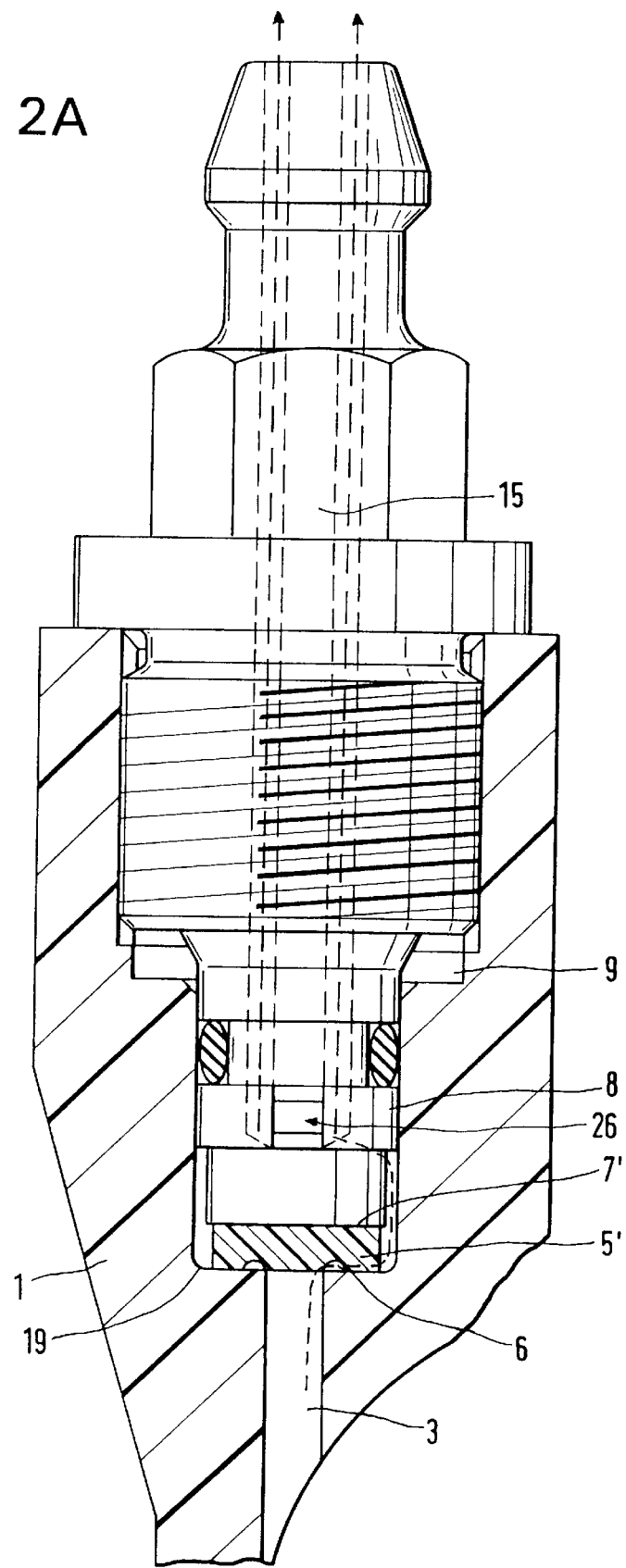
FIG. 2A shows FIG. 2 in more detail.

FIG. 2A shows the flow pathway between the access aperture 3 and the bleed duct 15 in which the bleed duct 15 has a rectangular opening 26 which permits fluid to enter the bleed duct 15.

Figure 3:
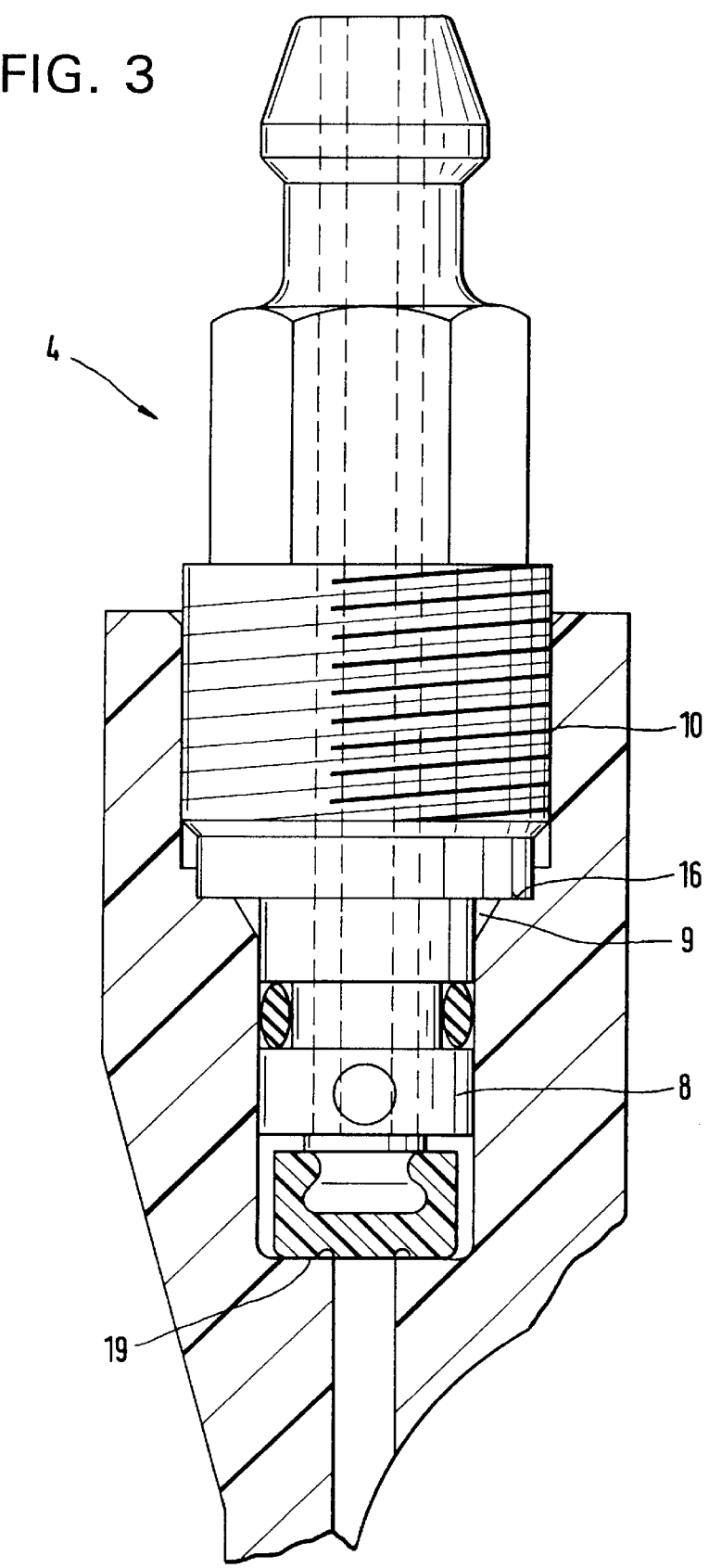
FIG. 3 shows an embodiment of the bleed element shown in FIG. 1.

FIG. 3 shows a variant of the embodiment shown in FIG. 1. To limit the axial travel of the bleed element 4, a shoulder protruding radially inward and which makes contact with a limit stop 16 on the bleed element 4 between the end shank 8 and the thread 10 is located behind the internal thread 10a in the aperture 9.

Figure 3A:
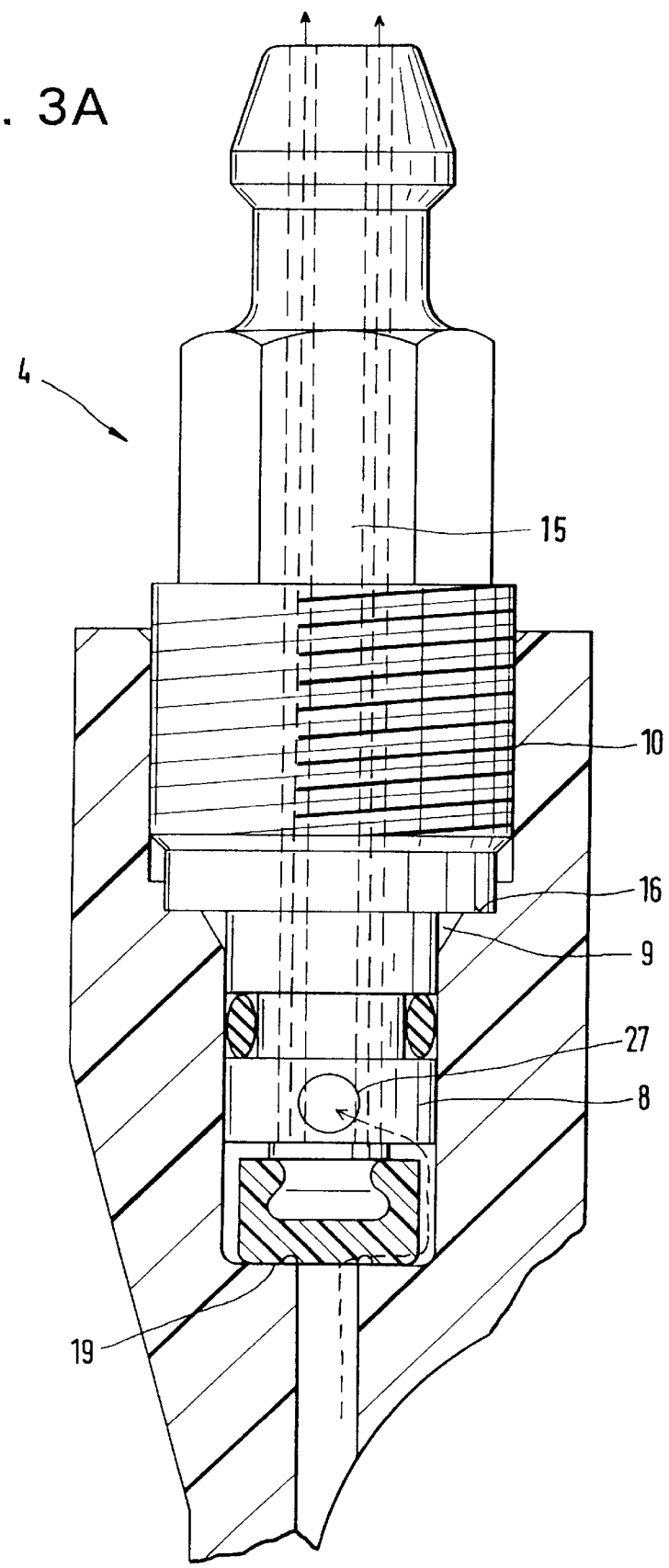
FIG. 3A shows FIG. 3 in more detail.

FIG. 3A shows the flow pathway between the access aperture 3 and the bleed duct 15 in which the bleed duct 15 has a circular opening 27 which permits fluid to enter the bleed duct 15.

Figure 4:
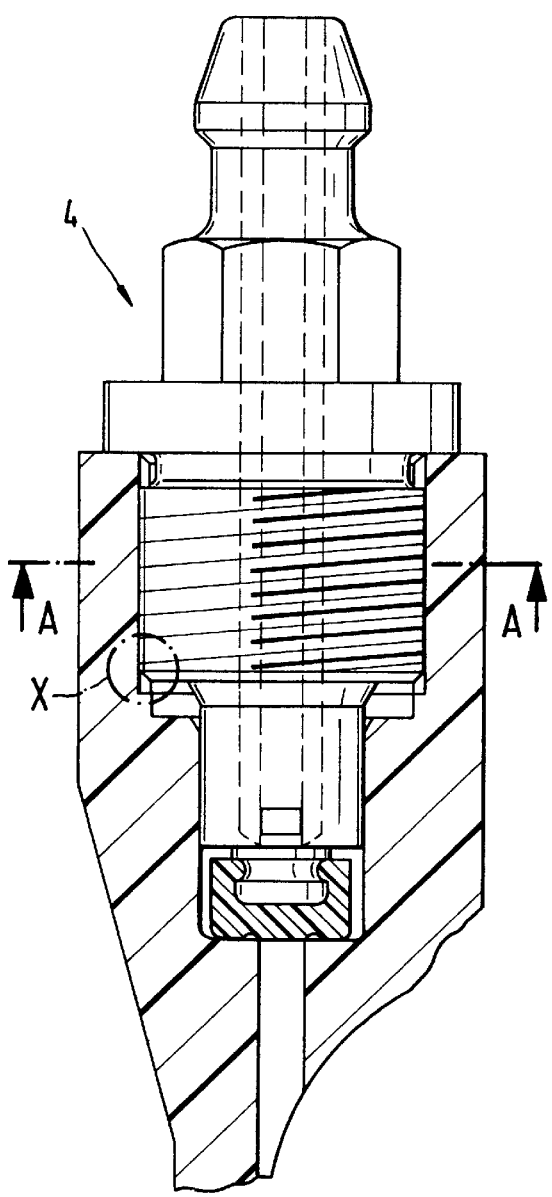
FIG. 4 shows an embodiment of a cylinder for pressure media in which the thread between the bleed element and casing is sealed.
Figure 4A:
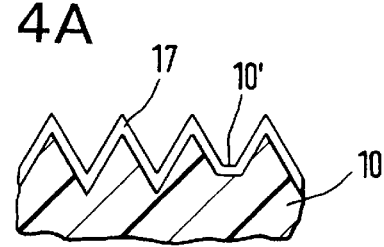
FIG. 4A shows a partial view of the bleed element thread.
Figure 4B:
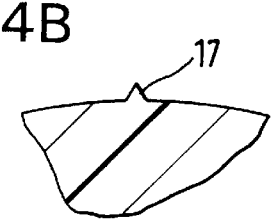
FIG. 4B shows an enlarged partial plan view of the bleed element.
Figure 4C:
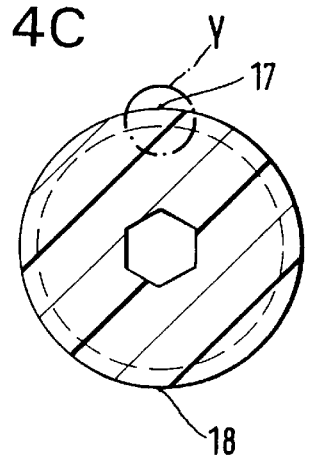
FIG. 4C shows a section along the line A—A in FIG. 4.
Figure 4D:
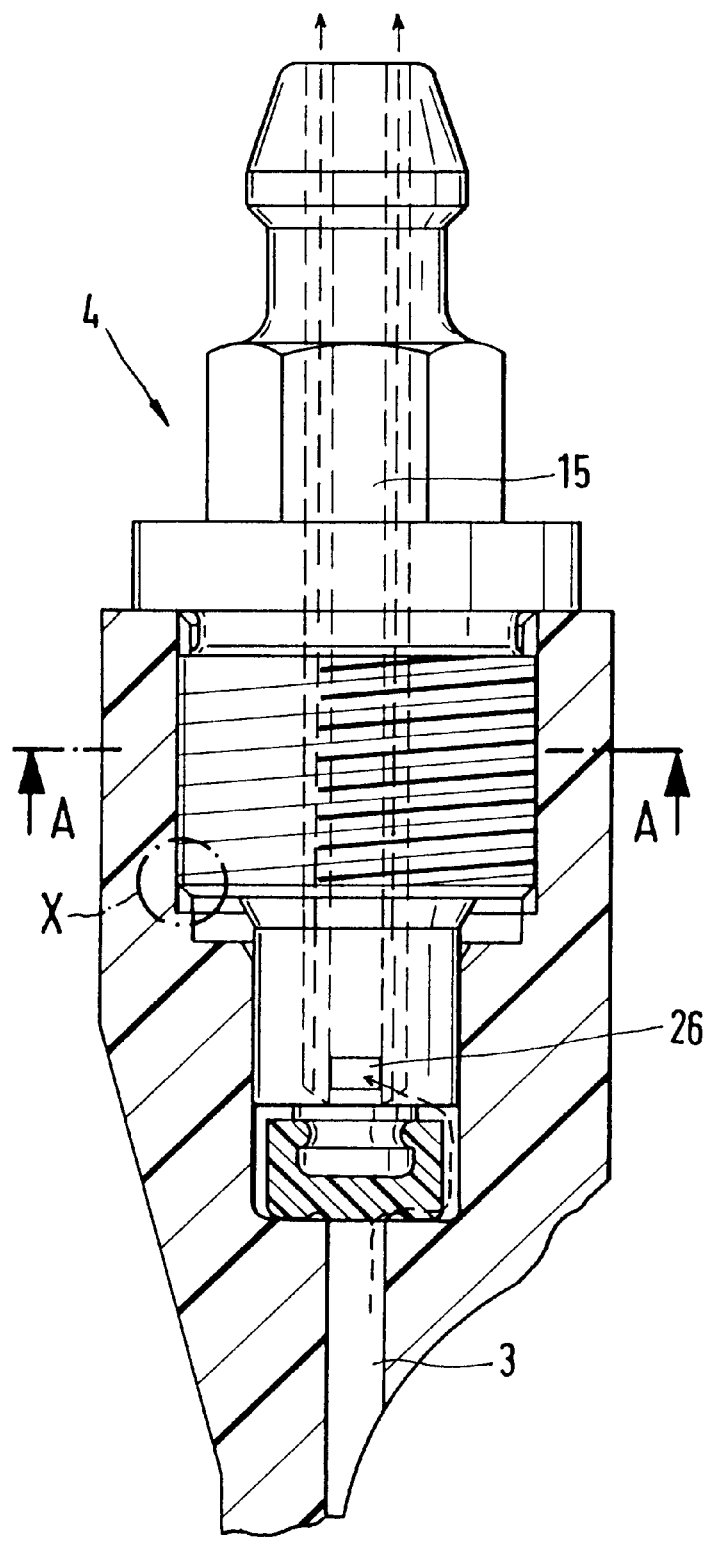
FIG. 4D shows FIG. 4 in more detail.

FIGS. 4a, 4b, and 4c show another embodiment of the bleed element in which there are two ribs 17, 18 extending radially over the threads 10, 10' to prevent leakage losses at the thread 10 of the bleed element 4. These diametrically opposed ribs 17, 18 are created during injection molding of the bleed element 4 by widening the mold seam so that material can accumulate there. The ribs 17, 18 protrude axially over the full length of the thread 10. It can be advantageous if the ribs 17, 18 extend over a complete turn 10' of the thread 10 in the lower region.

FIGS. 4D, 5, 5A, 6, 6A, 7, 7A, 8 and 8A show additional embodiments of the flow pathway between the access aperture 3 and the bleed duct 15 in which the bleed duct 15 has a rectangular opening 26.

FIGS. 5, 5A, 6, 6A, 7, 7A, 8 and 8A show additional embodiments of a cylinder for pressure media in which an axial seal is formed by means of an O-ring 20, 20' located at one end of the bleed element 4.

As can be seen in FIGS. 5, 5A, 6 and 6A, the O-ring 20 lies in a groove 21 in the bleed element 4. At the axial end of the groove 21 toward the casing, the bleed element 4 transitions into a journal 22 whose outside diameter is less than the outside diameter at the other side of the groove 21. This journal 22 centers the bleed element in a narrowing section 9a of the stepped or graduated aperture 9.

Figure 5:
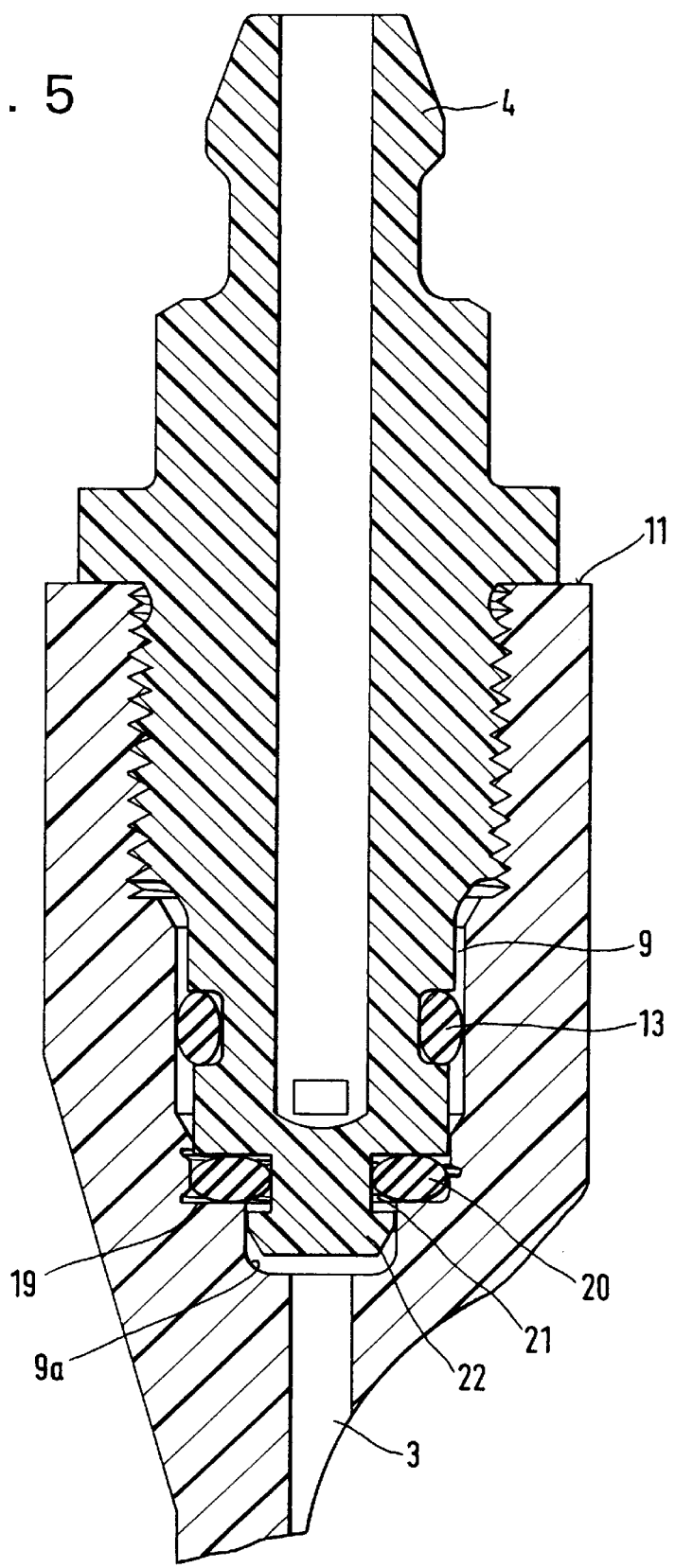
FIG. 5 shows another embodiment of a bleed element screwed into a cylinder for pressure media, with the bleed element in the closed position.
Figure 5A:
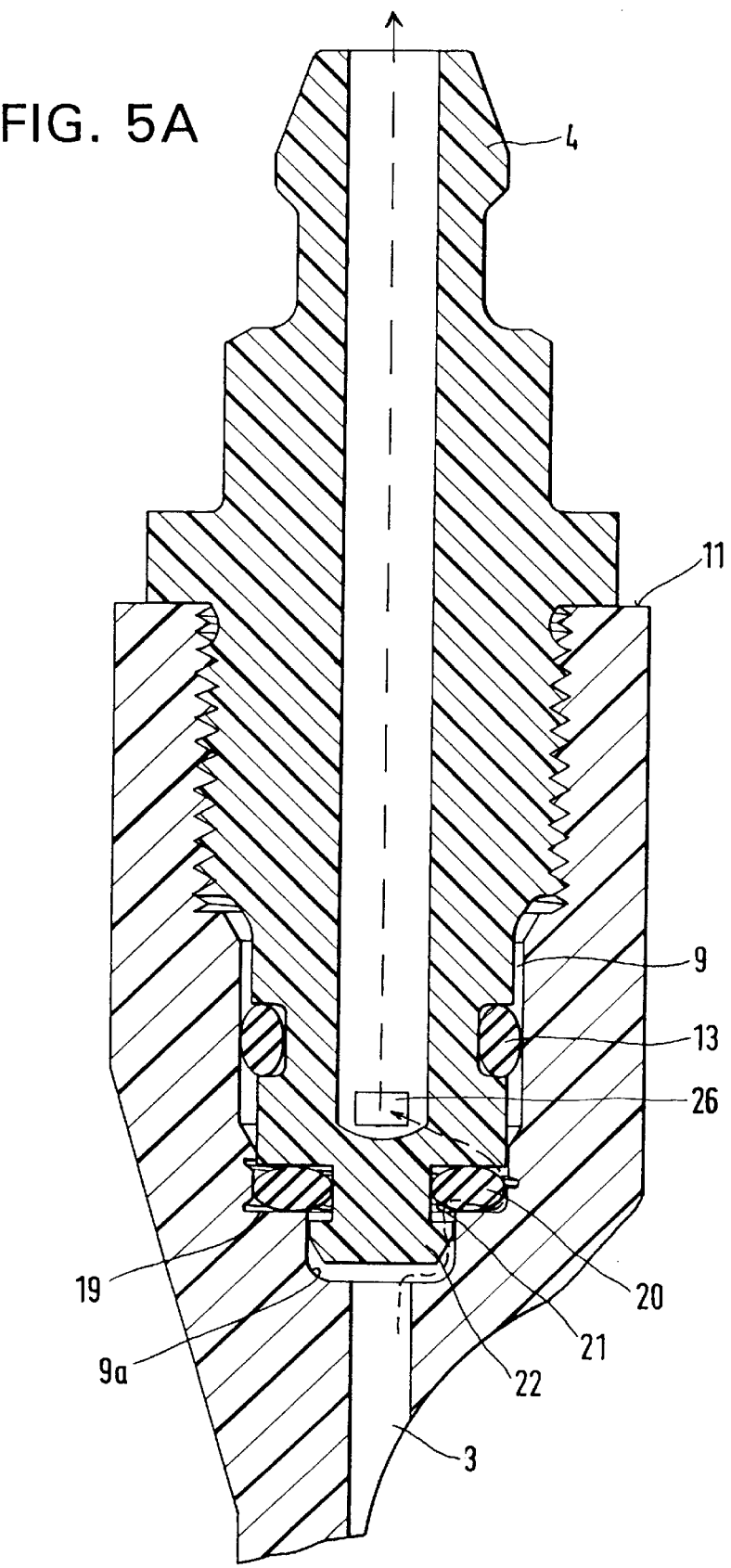
FIG. 5A shows FIG. 5 in more detail.
Figure 6:
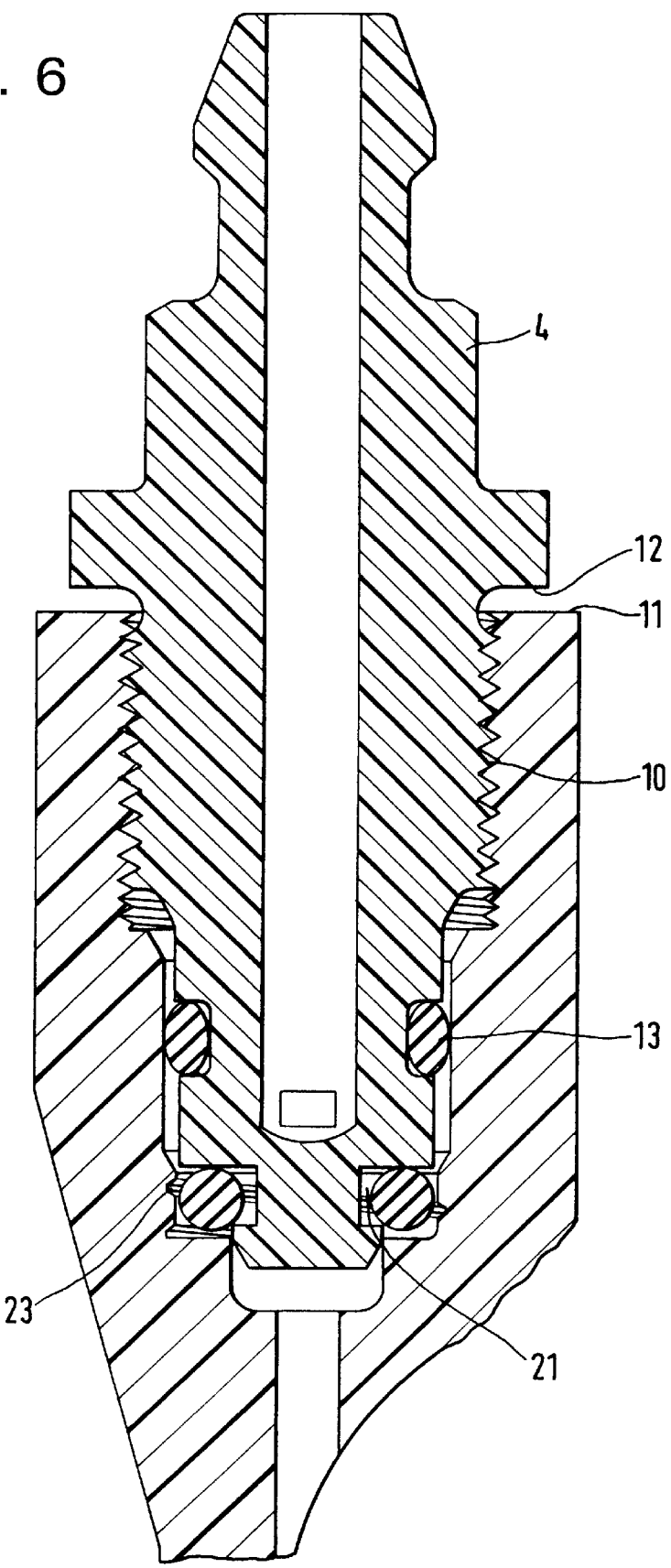
FIG. 6 shows the cylinder from FIG. 5 with the bleed element open.
Figure 6A:
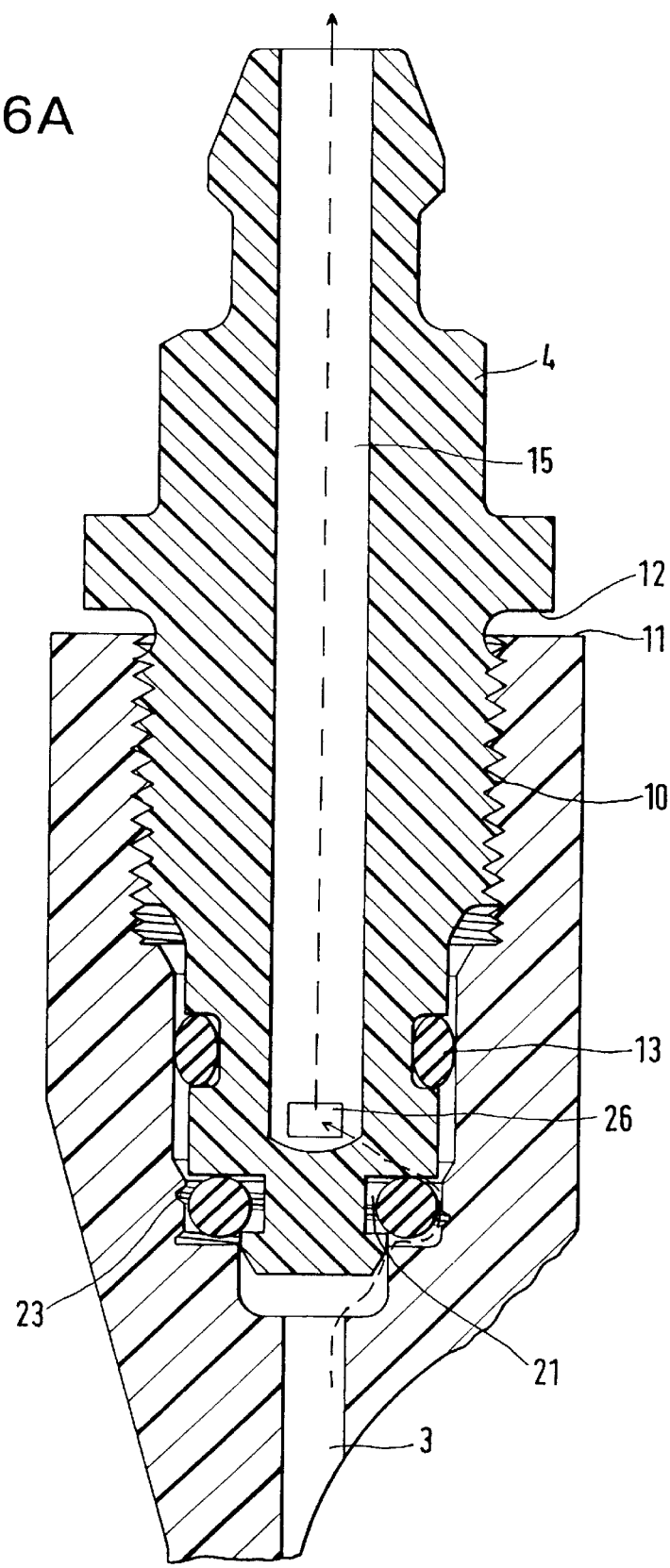
FIG. 6A shows FIG. 6 in more detail.

FIGS. 5A and 6A also show a rectangular opening 26 to allow a flow path through the cylinder.

FIG. 6 illustrates the withdrawn position, where the shoulder 12 no longer makes contact with the contact point 11. Also a bleed duct 23 is now open by the withdrawal of the bleed element 4.

Figure 7:
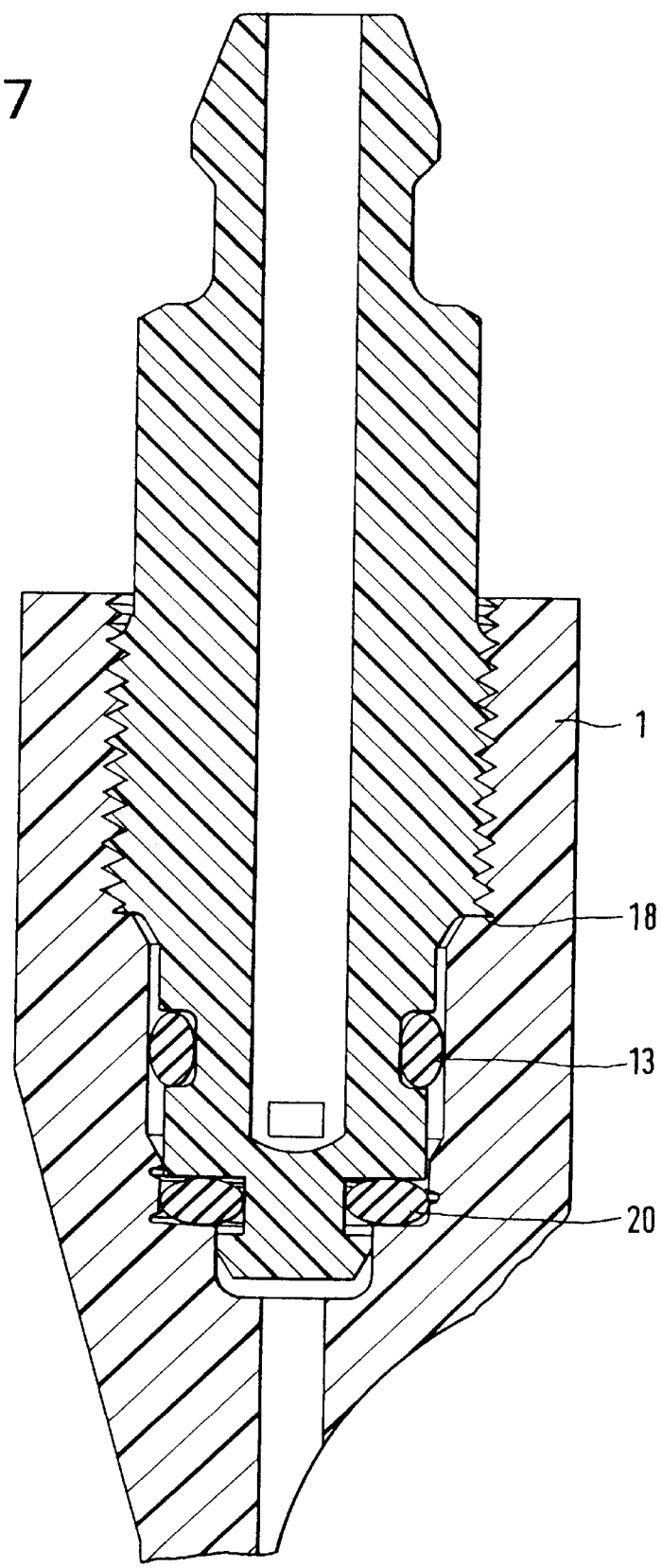
FIG. 7 shows a variant of the embodiment shown in FIG. 5.
Figure 7A:
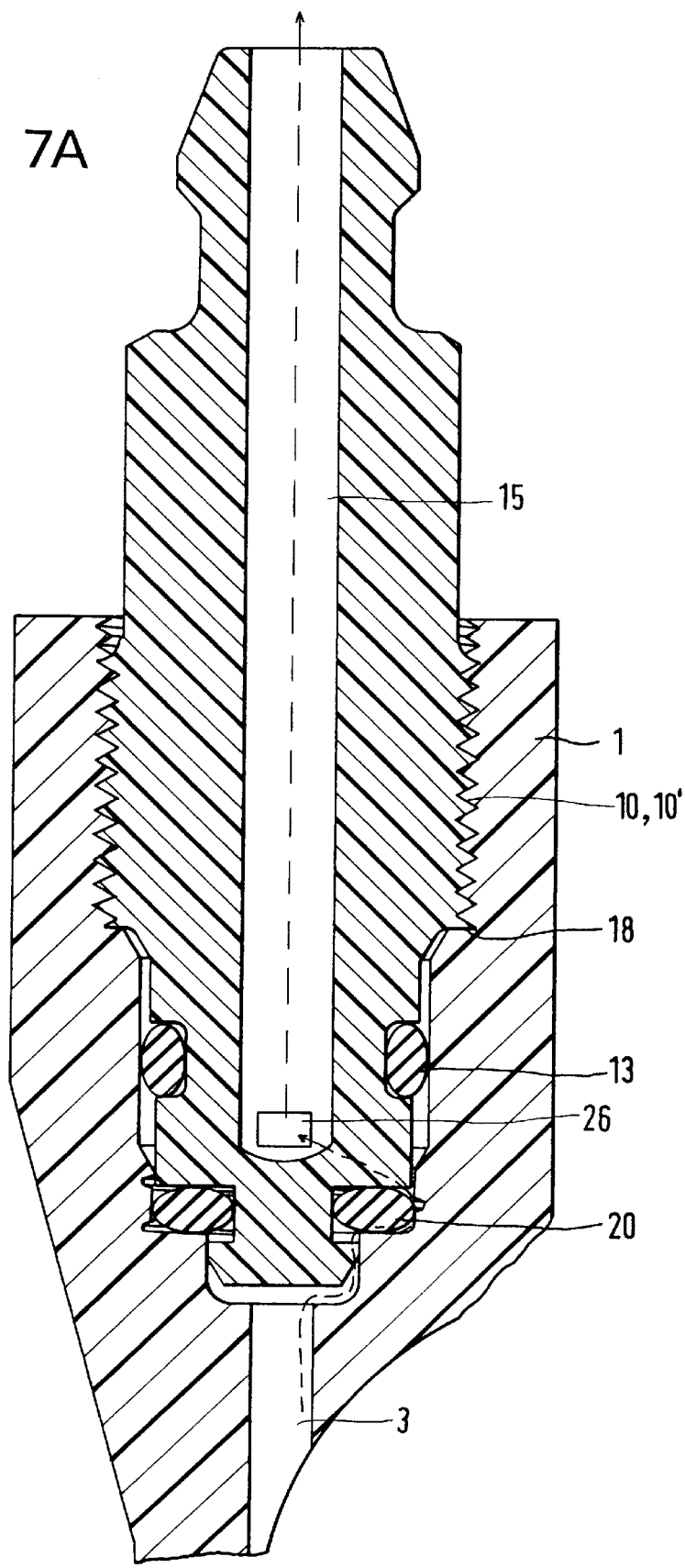
FIG. 7A shows FIG. 7 in more detail.

FIGS. 7 and 7A illustrate an embodiment of the bleed element 4 which, similar to the one in FIG. 3, does not have an external shoulder to seat on the casing 1. Instead, a stop 16 is provided at the end of the threads 10, 10' which internally seat the bleed element 4 against the casing 1.

Figure 8:
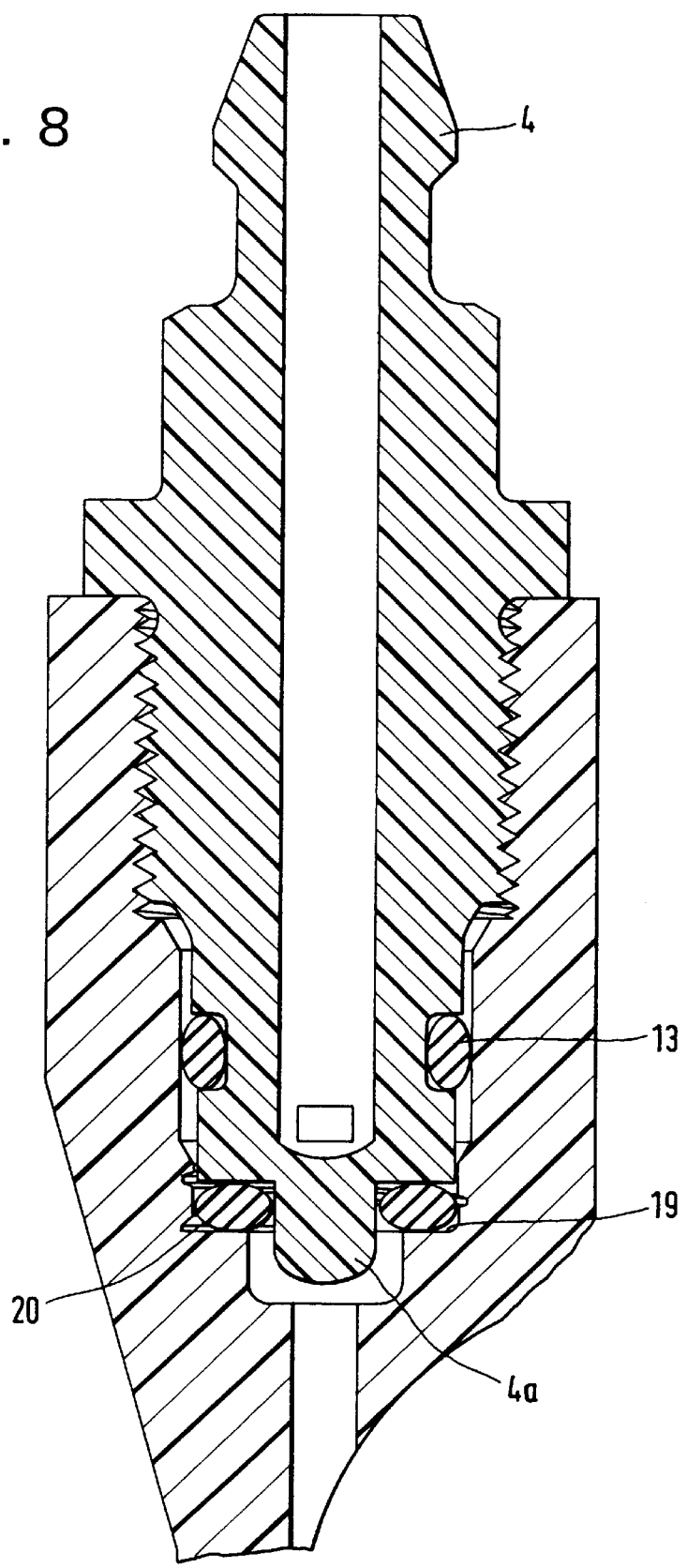
FIG. 8 shows another embodiment of a bleed element screwed into a cylinder for pressure media.
Figure 8A:
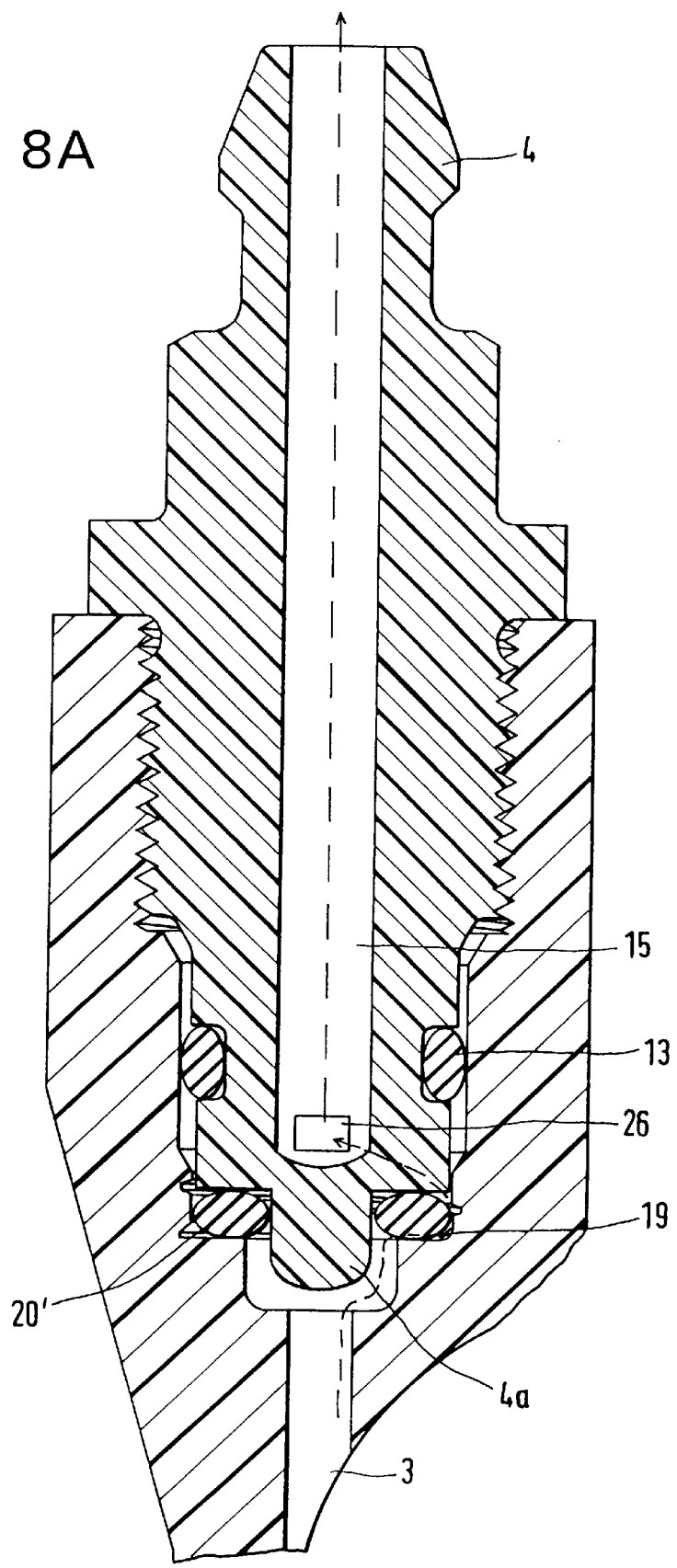
FIG. 8A shows FIG. 8 in more detail.

In the embodiment shown in FIGS. 8 and 8A, the O-ring 20' is loosely connected to the bleed element 4. The inner diameter of the O-ring 20' fits around a correspondingly shaped tapered section 4a on one end of the seal element 4. Function is otherwise identical to that of the embodiment described above. The advantage of the loosely mounted O-ring 20' is that manufacturing costs are low compared to the grooved design. The disadvantage is that, under certain usage conditions, it may not be certain that the O-ring 20' has been removed from the cylinder 1 and has not been inadvertently left on the shoulder 19.

Figure 9:
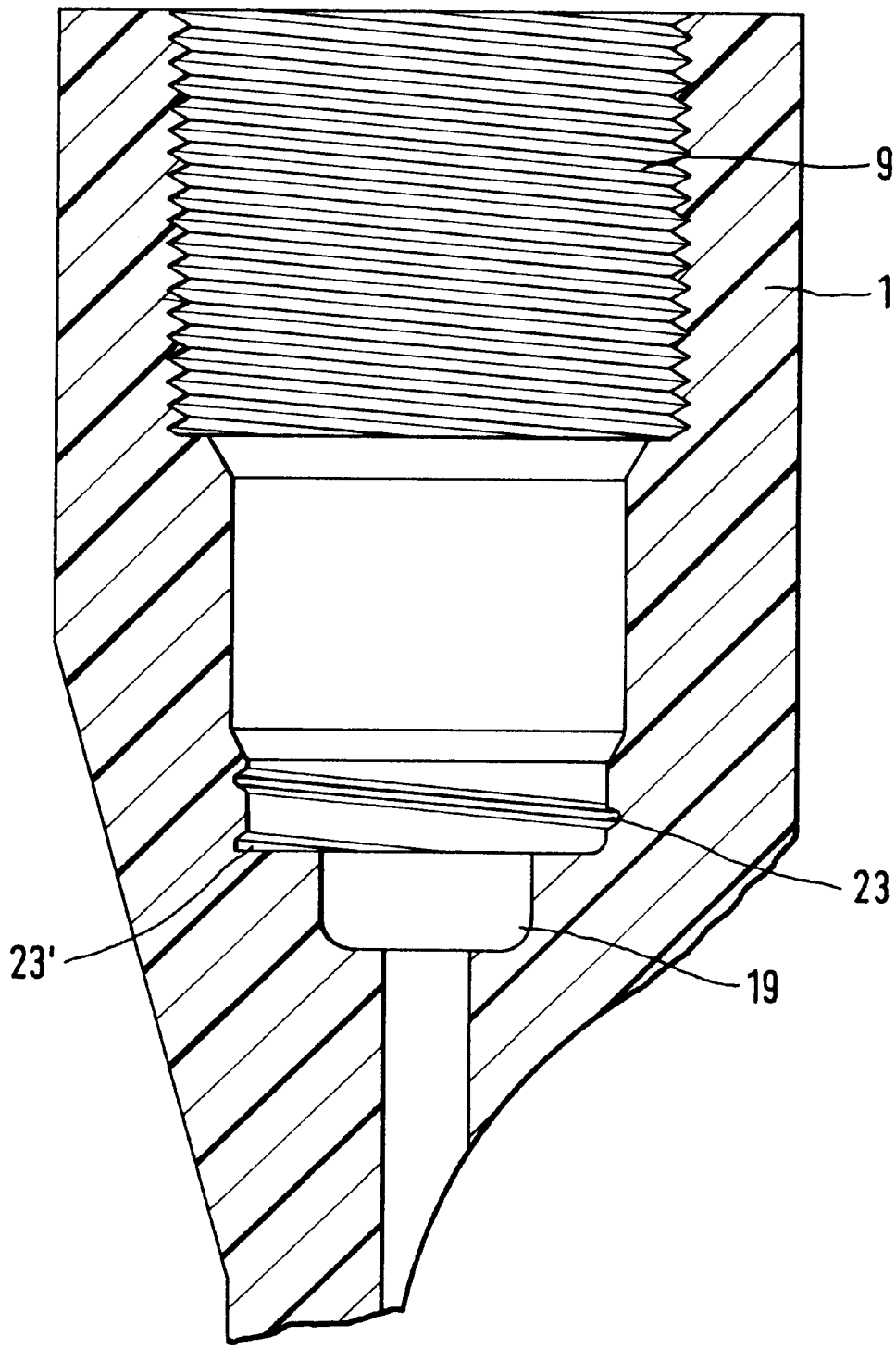
FIG. 9 shows a section through the cylinder at the height of the bleed element.
Figure 10:
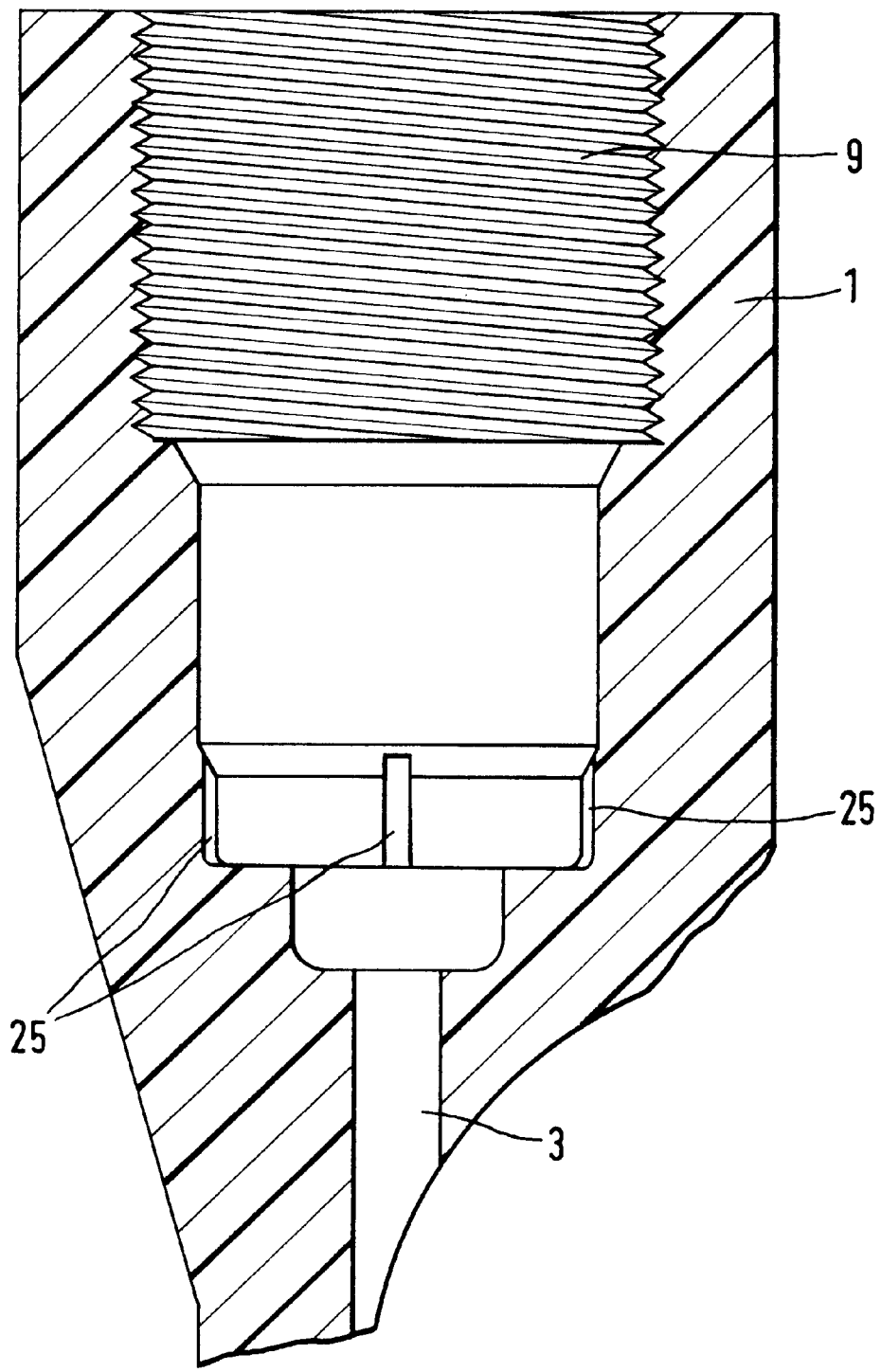
FIG. 10 shows the section shown in FIG. 9 for another embodiment of a cylinder for pressure media.

The internal pressure exerted on the O-ring 20, 20' via the access aperture 3 results in the further distortion of the O-ring 20, 20', enhancing the axial seal. So that the cylinder may be safely bled even if pressurized internally, the aperture 9 is as shown in FIGS. 9 and 10 equipped with one or more bleed ducts 23, 25 in the vicinity of the seat for the O-ring 20, 20'. The bleed duct 23 shown in FIG. 9 is helical, with its mouth 23' located at the shoulder 19. A brief lifting of the O-ring 20 from its seat on the shoulder 19 permits bleeding via the bleed duct 23 even if the O-ring 20 is pressurized from within.

FIG. 10 shows that one or more grooves 25 distributed over the circumference of the aperture 9 can also serve as bleed ducts.

The figures represent otherwise identical or functionally identical components with the same reference numbers.

One feature of the invention resides broadly in the cylinder for pressure media, in particular a hydraulic master or servant cylinder in motor vehicles, having a bleed element 4 which can be screwed into an aperture 9 in the cylinder casing 1 and which is sealed against the casing 1, characterized by the fact that the bleed element 4 is functionally connected in the vicinity of that end inserted in the casing to a round sealing element 5, 5'; 20, 20', which is pressed axially against a shoulder 19 in the aperture 9.

Another feature of the invention resides broadly in the cylinder for pressure media characterized by the fact that the sealing element 5, 5' has a planar sealing surface and is located on the face between the bleed element 4 and the casing 1.

Yet another feature of the invention resides broadly in the cylinder for pressure media characterized by the fact that the sealing element is realized as an elastic cap 5 mounted on the end of a journal or a pin or a stud 7 of the bleed element 4, which cap can be braced against a bead 6 on the floor of the aperture 9.

Still another feature of the invention resides broadly in the cylinder for pressure media characterized by the fact that the sealing element 3 can be inserted in the aperture 9 and braced against a bead 6 on the floor of the aperture 9 and a planar journal 7 on the face of the bleed element 4.

A further feature of the invention resides broadly in the cylinder for pressure media characterized by the fact that the bead 6 is ring-shaped.

Another feature of the invention resides broadly in the cylinder for pressure media characterized by the fact that the bead is immediately adjacent to the opening of the access aperture 3 to the plenum 2.

Yet another feature of the invention resides broadly in the cylinder for pressure media characterized by the fact that the sealing element 20, 20' is ring-shaped.

Still another feature of the invention resides broadly in the cylinder for pressure media characterized by the fact that the sealing element is an O-ring 20 seated in a groove 21.

A further feature of the invention resides broadly in the cylinder for pressure media characterized by the fact that the end of the bleed element 4 inserted into the casing transitions into a journal 22 which engages in a narrowing section 9a of the aperture to center the bleed element.

Another feature of the invention resides broadly in the cylinder for pressure media characterized by the fact that the aperture 9 is equipped with a radial, helical bleed duct 23 at the height of the sealing element 20, 20', the mouth of which bleed duct ends at the shoulder 19.

Yet another feature of the invention resides broadly in the cylinder for pressure media characterized by the fact that the aperture 9 has at least one axial groove 25 at the height of the sealing element 20, 20'.

Still another feature of the invention resides broadly in the cylinder for pressure media characterized by the fact that there is a plurality of grooves 25 distributed around the circumference.

A further feature of the invention resides broadly in the cylinder for pressure media characterized by the fact that the depth to which the bleed element 4 can be screwed in is limited by means of a radially protruding shoulder 12 which makes contact with the outside of the casing 1.

Another feature of the invention resides broadly in the cylinder for pressure media characterized by the fact that the depth to which the bleed element 4 can be screwed in is limited by means of a shoulder located behind the thread 10a in the aperture 9 of the thread and extending radially inward, with which shoulder a surface 16 of the bleed element 4 makes contact.

Yet another feature of the invention resides broadly in the cylinder for pressure media characterized by the fact that there is a radial seal 13 to prevent fluid from leaking between the sealing element 5, 5'; 20, 20' and the thread 10 of the bleed element 4.

Still another feature of the invention resides broadly in the cylinder for pressure media characterized by the fact that there are two diametrical ribs 17, 18 which protrude radially outward over the threads and run the entire length of the external thread 10 of the bleed element 4.

A further feature of the invention resides broadly in the cylinder for pressure media characterized by the fact that the ribs 17, 18 protrude axially over a complete turn 10'.

Some examples of hydraulic master and servant cylinders which could possibly utilize the bleed element of the present invention are disclosed by the following U.S. patent applications: Ser. No. 08/389,012 to Grosspietsch et al., entitled "Cylinder with Plug-in Connection", which application was refiled on Mar. 21, 1997 as a file-wrapper continuation as Ser. No. 08/821,169 and has issued as U.S. Pat. No. 5,779,019 on Jul. 14, 1998; Ser. No. 08/428,700 to Link et al., entitled "Hydraulic System with a Multiplicity of Cylinders", which application has issued as U.S. Pat. No. 5,638,934 on Jun. 17, 1997; Ser. No. 08/561,288 to Grosspietsch et al., entitled "Cylinder for Hydraulic Systems, in particular for Motor Vehicles", which application has issued as U.S. Pat. No. 5,704,462 on Jan. 6, 1998.

Some examples of clutch assemblies and various components associated therewith which could possibly utilize the present invention may be disclosed in the following U.S. Patents: U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Some examples of hydraulic clutch systems which could possibly utilize the piston-cylinder arrangement of the present invention are disclosed by the following U.S. Patents, each of which is assigned to the assignee of the present invention: U.S. Pat. No. 5,211,099 to Grosspietsch et al., dated May 18, 1993 and entitled "Slave Cylinder for a Hydraulic Actuating System of a Motor Vehicle Friction Clutch"; U.S. Pat. No. 5,052,279 to Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

Some additional examples of hydraulic and/or pneumatic devices which can possibly utilize the piston-cylinder arrangement of the present invention are disclosed by the following U.S. Patents: U.S. Pat. No. 5,092,125 to Leight et al., entitled "Seal"; U.S. Pat. No. 4,635,778 to Lederman, entitled "Fluid-Operated Piston"; U.S. Pat. No. 4,960,188 to Wossner, entitled "Single-Tube Vibration Damper of Variable Damping Force"; U.S. Pat. No. 5,064,030 to Wossner, entitled "Impact Damping Unit"; U.S. Pat. No. 4,599,860 to Parsons, entitled "Liquid Pressure Apparatus"; and U.S. Pat. No. 2,317,601 to Fowler on Mar. 7, 1940, entitled "Pressure Braking System".

Hydraulic braking systems which could also possibly utilize the present invention may be disclosed in the following U.S. Patents: U.S. Pat. No. 4,634,190 to Wupper, entitled "Hydraulic Brake System With Slip Control"; U.S. Pat. No. 4,643,488 to Reinartz, entitled Hydraulic Vehicle Servo Brake"; U.S. Pat. No. 4,643,489 to Reinartz et al., entitled "Hydraulic Brake System With Slip Control"; U.S. Pat. No. 4,656,833 to Belart, entitled Hydraulic Brake System for Automotive Vehicles"; and U.S. Pat. No. 4,902,077 to Belart et al., entitled "Hydraulic Brake System".

Types of impact dampers for bumpers which could possibly utilize the present invention may be disclosed in the following U.S. Patents: U.S. Pat. No. 4,809,924 to Martens et al., entitled "Hydraulic Bumper"; U.S. Pat. No. 5,096,242 to Chin-Hun, entitled "Shock Absorbing Bumper System"; and U.S. Pat. No. 5,277,462 to Verzelli et al., entitled "High-performance Car Bumper Module".

Types of strut assemblies which could possibly utilize the present invention may be disclosed in the following U.S. Patents: U.S. Pat. No. 4,828,237 to Neff, entitled "Reduced Length MacPherson Strut"; and U.S. Pat. No. 4,861,066 to Dernie, entitled "Vehicle Suspension Strut Systems".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 196 48 683.1, filed on Nov. 25, 1996, and Inner Priority 196 20 188.8, filed on May 20, 1996, having inventors Thomas Riess, Olaf Pagels, Boleslaw Tulaczko, and Wolfgang Grosspietsch, and DE-OS 196 48 683.1, filed on Nov. 25, 1996, and Inner Priority 196 20 188.8, filed on May 20, 1996, and DE-PS 196 48 683.1, filed on Nov. 25, 1996, and Inner Priority 196 20 188.8, filed on May 20, 1996.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A piston-cylinder arrangement for a hydraulic system in a motor vehicle, said piston-cylinder arrangement comprising:

a hydraulic actuating apparatus;
said hydraulic actuating apparatus comprising:
a cylinder, said cylinder having a first end and a second end and defining a chamber therein, at least a portion of said chamber being configured to contain hydraulic fluid therein;
a piston rod extending through said first end of said cylinder and into said chamber;
an outlet for providing hydraulic fluid to flow into and out of said chamber;
said cylinder comprising:
a piston being disposed on said piston rod within said chamber, said piston dividing said chamber into at least two chamber portions, said piston being movable within said chamber;
at least one of said at least two chamber portions being configured to contain said hydraulic fluid therein;
a connection for connecting said outlet for providing said hydraulic fluid to said at least one of said at least two chamber portions containing hydraulic fluid therein;
an arrangement to permit bleeding of hydraulic fluid from said cylinder;
said bleeding arrangement comprising an element being disposed to permit bleeding of hydraulic fluid from said cylinder;
said bleeding element comprising a first end portion and a second end portion;
said cylinder comprising an aperture to receive said first end portion of said bleeding element and to permit bleeding of hydraulic fluid from said cylinder;
said aperture having a longitudinal axis along which said first end portion of said bleeding element is insertable;
said aperture having a first shoulder within said aperture;
said first shoulder being disposed substantially transverse to the longitudinal axis of said aperture;
said first end portion of said bleeding element extending into said aperture and said second end portion of said bleeding element extending from said aperture;
an element for sealing said aperture, said sealing element being disposed between said first end portion of said bleeding element and said first shoulder of said aperture;
said bleeding element being configured and disposed to selectively press and release said sealing element against said first shoulder in a direction substantially along the longitudinal axis of said aperture and for permitting and stopping bleeding of hydraulic fluid from said cylinder;
said sealing element being round;
said bleeding element comprising a threaded portion;
said aperture comprising a threaded portion;
said threaded portion of said bleeding element and said threaded portion of said aperture being configured to screw said bleeding element and said aperture together;
said sealing element comprising a first side and a second side;
said first side being disposed adjacent to said first shoulder of said aperture;
said second side being disposed on a side of said sealing element opposite said first side;
said arrangement comprising one of a), b) and c), as follows:
a) said sealing element comprising a ring-shaped sealing element;
b) said bleeding element comprising a groove; and said sealing element comprising an O-ring to be seated in said groove of said bleeding element; and
c) said bleeding element comprising a stud; and said stud extending from said first end portion of said bleeding element;
said sealing element comprising an elastic cap mounted onto said stud of said bleeding element;
said sealing element having a height along the longitudinal axis of said aperture;
said aperture comprising a pathway to permit bleeding of said cylinder;

said bleed path comprising one of d) and e) as follows:
 d) a radial, helical bleed duct;
  said bleed duct extending along the height of said sealing element;
  said bleed duct comprising a mouth;
  said mouth being configured and disposed to receive hydraulic fluid from said cylinder at said first shoulder of said aperture; and
 e) at least one axial groove; and
  said groove extending along the height of said sealing element.

2. The arrangement according to claim 1 wherein:
said bleed path comprises said at least one axial groove;
said at least one axial groove comprises a plurality of grooves;
said plurality of grooves extend along the height of said sealing element; and
said plurality of grooves are distributed around the circumference of said aperture.

3. The arrangement according to claim 2 including an arrangement for limiting insertion of said bleeding element into said aperture;
said arrangement comprising at least one of a) and b) as follows:
 a) said aperture having a diameter;
  an area surrounding said aperture;
  said second end portion of said bleeding element comprising a shoulder extending radially outward;
  said shoulder of said second end portion of said bleeding element having a diameter;
  the diameter of said aperture being less than the diameter of said shoulder of said second end portion of said bleeding element; and
  said shoulder of said second portion of said bleeding element being disposed to contact said area surrounding said aperture; and
 b) said aperture having a second shoulder disposed within said aperture;
  said second shoulder of said aperture extending radially inward toward the longitudinal axis of said aperture;
  said first end portion of said bleeding element having a surface; and
  said surface of said first end portion of said bleeding element being configured and disposed to contact said second shoulder of said aperture.

4. The arrangement according to claim 3 including an arrangement to prevent hydraulic fluid from leaking past said threaded portion of said bleeding element and said threaded portion of said aperture;
said arrangement to prevent hydraulic fluid leakage comprising at least one of a) b) and c) as follows:
 a) a radial seal being disposed between said sealing element and said threaded portion of said bleeding element;
 b) at least two ribs, said at least two ribs being disposed on said threaded portion of said bleeding element;
  said at least two ribs being diametrically opposed from one another;
  said at least two ribs protruding radially outward from said threaded portion of said bleeding element; and
 c) at least two ribs, said at least two ribs being disposed on said threaded portion of said aperture;
  said at least two ribs being diametrically opposed from one another;
  said ribs protruding radially inward from said threaded portion of said aperture.

5. The arrangement according to claim 4 comprising:
at least two ribs, said at least two ribs being disposed on said threaded portion of said bleeding element;
said at least two ribs being diametrically opposed from one another;
said at least two ribs being disposed to protrude radially outward from said threaded portion of said bleeding element;
said at least two ribs protruding axially over a complete turn of said threaded portion of said bleeding element.

6. A piston-cylinder arrangement for a hydraulic system in a motor vehicle, said piston-cylinder arrangement comprising;
a hydraulic actuating apparatus;
said hydraulic actuating apparatus comprising:
 a cylinder, said cylinder having a first end and a second end and defining a chamber therein, at least a portion of said chamber being configured to contain hydraulic fluid therein;
 a piston rod extending through said first end of said cylinder and into said chamber;
 an outlet for providing hydraulic fluid to flow into and out of said chamber;
 said cylinder comprising:
  a piston being disposed on said piston rod within said chamber, said piston dividing said chamber into at least two chamber portions, said piston being movable within said chamber;
  at least one of said at least two chamber portions being configured to contain said hydraulic fluid therein;
  a connection for connecting said outlet for providing said hydraulic fluid to said at least one of said at least two chamber portions containing hydraulic fluid therein;
  an arrangement to permit bleeding of hydraulic fluid from said cylinder;
  said bleeding arrangement comprising an element being disposed to permit bleeding of hydraulic fluid from said cylinder;
 said bleeding element comprising a first end portion and a second end portion;
 said cylinder comprising an aperture to receive said first end portion of said bleeding element and to permit bleeding of hydraulic fluid from said cylinder;
 said aperture having a longitudinal axis along which said first end portion of said bleeding element is insertable;
 said aperture having a first shoulder within said aperture;
 said first shoulder being disposed substantially transverse to the longitudinal axis of said aperture;
 said first end portion of said bleeding element extending into said aperture and said second end portion of said bleeding element extending from said aperture;
 an element for sealing said aperture, said sealing element being disposed between said first end portion of said bleeding element and said first shoulder of said aperture;
 said bleeding element being configured and disposed to selectively press and release said sealing element against said first shoulder in a direction substantially along the longitudinal axis of said aperture and for permitting and stopping bleeding of hydraulic fluid from said cylinder;

said bleeding element comprising a threaded portion;

said aperture comprising a threaded portion;

said threaded portion of said bleeding element and said threaded portion of said aperture being configured to screw said bleeding element and said aperture together;

said cylinder comprising an arrangement to prevent hydraulic fluid from leaking past said threaded portion of said bleeding element and said threaded portion and of said aperture;

said arrangement to prevent hydraulic fluid leakage comprising at least two ribs, said at least two ribs being disposed on said threaded portion of said bleeding element;

said at least two ribs being diametrically opposed from one another;

said at least two ribs being disposed to protrude radially outward from said threaded portion of said bleeding element;

said at least two ribs protruding axially over a complete turn of said threaded portion of said bleeding element.

7. The arrangement according to claim 6 wherein said sealing element is round.

8. The arrangement according to claim 7 wherein:

said sealing element comprises a first side and a second side;

said first side is disposed adjacent to said first shoulder of said aperture; and said second side is disposed on a side of said sealing element opposite said first side.

9. The arrangement according to claim 8 wherein:

said first side of said sealing element comprises a planar sealing surface;

said first shoulder of said aperture comprises a surface;

said first shoulder comprises a bead;

said bead protrudes from said surface toward said first side of said sealing element; and said bead is disposed to contact said first side of said sealing element prior to contact of said first side with a substantial portion of said surface of said first shoulder.

10. The arrangement according to claim 9 wherein said bead comprises at least one of a) and b) as follows:

a) a ring-shaped bead; and b) a bead which is disposed immediately adjacent to said aperture.

11. The arrangement according to claim 10 wherein said bleeding element comprises one of a) and b) as follows:

a) a stud, said stud extending from said first end portion of said bleeding element on which stud said sealing element comprising an elastic cap is mounted; and b) a journal, said journal having a surface;

said surface of said journal being disposed toward said first shoulder of said aperture; and said surface of said journal being planar.

12. A piston-cylinder arrangement for a hydraulic system in a motor vehicle, said piston-cylinder arrangement comprising:

a hydraulic actuating apparatus;

said hydraulic actuating apparatus comprising:

a cylinder, said cylinder having a first end and a second end and defining a chamber therein, at least a portion of said chamber being configured to contain hydraulic fluid therein;

a piston rod extending through said first end of said cylinder and into said chamber;

an outlet for providing hydraulic fluid to flow into and out of said chamber;

said cylinder comprising:

a piston being disposed on said piston rod within said chamber, said piston dividing said chamber into at least two chamber portions, said piston being movable within said chamber;

at least one of said at least two chamber portions being configured to contain said hydraulic fluid therein;

a connection for connecting said outlet for providing said hydraulic fluid to said at least one of said at least two chamber portions containing hydraulic fluid therein;

an arrangement to permit bleeding of hydraulic fluid from said cylinder;

said bleeding arrangement comprising an element being disposed to permit bleeding of hydraulic fluid from said cylinder;

said bleeding element comprising a first end portion and a second end portion;

said cylinder comprising an aperture to receive said first end portion of said bleeding element and to permit bleeding of hydraulic fluid from said cylinder;

said aperture having a longitudinal axis along which said first end portion of said bleeding element is insertable;

said aperture having a first shoulder within said aperture;

said first shoulder being disposed substantially transverse to the longitudinal axis of said aperture;

said first end portion of said bleeding element extending into said aperture and said second end portion of said bleeding element extending from said aperture;

an element for sealing said aperture, said sealing element being disposed between said first end portion of said bleeding element and said first shoulder of said aperture;

said bleeding element being configured and disposed to selectively press and release said sealing element against said first shoulder in a direction substantially along the longitudinal axis of said aperture and for permitting and stopping bleeding of hydraulic fluid from said cylinder;

said sealing element being round;

said sealing element having a height along the longitudinal axis of said aperture;

said aperture comprising a pathway to permit bleeding of said cylinder;

said bleed path comprising one of a) and b) as follows:

a) a radial, helical bleed duct;

said bleed duct extending along the height of said sealing element;

said bleed duct comprising a mouth; and said mouth being configured and disposed to receive hydraulic fluid from said cylinder at said first shoulder of said aperture; and b) at least one axial groove; and said groove extending along the height of said sealing element.

13. The arrangement according to claim 12 wherein:

said bleeding element comprises a threaded portion;

said aperture comprises a threaded portion; and said threaded portion of said bleeding element and said threaded portion of said aperture are configured to screw said bleeding element and said aperture together.

14. The arrangement according to claim 13 wherein:

said bleed path comprises said at least one axial groove;

said at least one axial groove comprises a plurality of grooves;

said plurality of grooves extend along the height of said sealing element; and said plurality of grooves are distributed around the circumference of said aperture.

15. The arrangement according to claim 14 including an arrangement for limiting insertion of said bleeding element into said aperture;

said arrangement comprising at least one of a) and b) as follows:
- a) said aperture having a diameter;
  - an area surrounding said aperture;
  - said second end portion of said bleeding element comprising a shoulder extending radially outward;
  - said shoulder of said second end portion of said bleeding element having a diameter;
  - the diameter of said aperture being less than the diameter of said shoulder of said second end portion of said bleeding element; and
  - said shoulder of said second portion of said bleeding element being disposed to contact said area surrounding said aperture; and
- b) said aperture having a second shoulder disposed within said aperture;
  - said second shoulder of said aperture extending radially inward toward the longitudinal axis of said aperture;
  - said first end portion of said bleeding element having a surface; and
  - said surface of said first end portion of said bleeding element being configured and disposed to contact said second shoulder of said aperture.

16. The arrangement according to claim 15 including an arrangement to prevent hydraulic fluid from leaking past said threaded portion of said bleeding element and said threaded portion of said aperture;

said arrangement to prevent hydraulic fluid leakage comprising at least one of a) b) and c) as follows:
- a) a radial seal being disposed between said sealing element and said threaded portion of said bleeding element;
- b) at least two ribs, said at least two ribs being disposed on said threaded portion of said bleeding element;
  - said at least two ribs being diametrically opposed from one another;
  - said at least two ribs protruding radially outward from said threaded portion of said bleeding element; and
- c) at least two ribs, said at least two ribs being disposed on said threaded portion of said aperture;
  - said at least two ribs being diametrically opposed from one another;
  - said ribs protruding radially inward from said threaded portion of said aperture.

17. The arrangement according to claim 16 comprising:

at least two ribs, said at least two ribs being disposed on said threaded portion of said bleeding element;

said at least two ribs being diametrically opposed from one another;

said at least two ribs being disposed to protrude radially outward from said threaded portion of said bleeding element; and said at least two ribs protruding axially over a complete turn of said threaded portion of said bleeding element.

* * * * *

UNITED STATES PATENT AND TRADEMARK OFFICE
CERTIFICATE OF CORRECTION

PATENT NO. : 5,960,922
DATED : October 5, 1999
INVENTOR(S) : Thomas RIESS, Olaf PAGELS, Boleslaw TULACZKO and Wolfgang GROSSPIETSCH It is certified that error appears in the above-identified patent and that said Letters Patent is hereby corrected as shown below:

On the title page, item [56], under the U.S. PATENT DOCUMENTS section, column 2, after the '5,575,178  11/1996 Wu.' reference, insert the following references:

```
-- 3487896    1/1970     Becker et al.
   3561475    2/1971     Rockwell
   4552283    11/1985    Poldner
   2672999    3/1954     Protasoff--.
```

On the title page, item [56], under the FOREIGN PATENT DOCUMENTS section, column 2, after the '19516389 11/1996 Germany' reference, insert the following references:

```
-- 1425731    12/1968    Fed. Rep. of Germany
   56046172   4/1981     Japan (Abstract only)
   1956296    1/1972     Fed. Rep. of Germany--.
```

Signed and Sealed this

Thirteenth Day of February, 2001

*Attest:*

NICHOLAS P. GODICI

*Attesting Officer*     *Acting Director of the United States Patent and Trademark Office*